United States Patent
Wu et al.

(10) Patent No.: US 11,496,373 B2
(45) Date of Patent: Nov. 8, 2022

(54) ENHANCED CONVERSATION INTERFACE FOR NETWORK MANAGEMENT

(71) Applicant: Juniper Networks, Inc., Sunnyvale, CA (US)

(72) Inventors: Xiaoying Wu, Sunnyvale, CA (US); Jisheng Wang, Palo Alto, CA (US); Amin Toghi Eshghi, San Carlos, CA (US)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 17/158,853

(22) Filed: Jan. 26, 2021

(65) Prior Publication Data
US 2022/0239569 A1    Jul. 28, 2022

(51) Int. Cl.
*H04L 41/5074* (2022.01)
*G06F 16/9032* (2019.01)
(Continued)

(52) U.S. Cl.
CPC .... *H04L 41/5074* (2013.01); *G06F 16/90332* (2019.01); *H04L 41/046* (2013.01); *H04L 41/0677* (2013.01); *H04L 41/5012* (2013.01)

(58) Field of Classification Search
CPC ... G10L 15/18; G10L 15/183; G10L 15/1815; G10L 15/005; G10L 2015/223;
(Continued)

(56) References Cited

U.S. PATENT DOCUMENTS 8,700,875 B1 * 4/2014 Barron ............... G06F 16/1827
                                                711/170
10,019,305 B2 * 7/2018 Aneja ................ G06F 11/0709
(Continued)

FOREIGN PATENT DOCUMENTS

EP       3447662 A1 *  2/2019  ......... G06F 16/2428

OTHER PUBLICATIONS

Michael Bryant, 'What is Google Wifi and How Do I Get Started', Posted on GroovyPost, Aug. 26, 2019. Retrieved using Wayback machine on Jan. 26, 2022 from https://web.archive.org/web/20200930061436/https://www.groovypost.com/howto/what-is-googlewifi-and-how-do-i-get-started/ (Year: 2019).*
(Continued)

*Primary Examiner* — Dhairya A Patel
*Assistant Examiner* — Sandarva Khanal
(74) *Attorney, Agent, or Firm* — Shumaker & Sieffert, P.A.

(57) ABSTRACT

Disclosed is a network management system that provides an interface to enable diagnostics and troubleshoot of a remotely managed multi-site network. Some embodiments provide a natural language interface, while other embodiments provide a chatbot type interface that communicates with a technician via traditional text information on a display screen. The diagnostic and troubleshooting capabilities search a central data store that receives device property information from each site of the multi-site network. Based on devices or users that match portions of the entity, queries to the data store are initiated to obtain additional data on the devices. A response to the query is then provided based on the properties of the devices.

23 Claims, 16 Drawing Sheets

(51) Int. Cl.
*H04L 41/0677* (2022.01)
*H04L 41/5009* (2022.01)
*H04L 41/046* (2022.01)

(58) Field of Classification Search
CPC ......... G10L 15/19; G10L 15/00; G10L 15/08; G06F 16/3344; G06F 16/24578; G06F 11/0733; G06F 11/0793; G06F 9/453; G06F 11/079; G06F 16/248; G06F 16/338; G06F 16/2468; G06F 16/90344; G06F 16/90332; H04M 2250/74; G06Q 30/016; G06Q 10/20; H04L 41/5074; H04L 41/5012; H04L 41/0677; H04L 41/046
See application file for complete search history.

(56) References Cited

U.S. PATENT DOCUMENTS

| | | | |
|---|---|---|---|
| 10,198,511 B1 | 2/2019 | Gupta et al. | |
| 10,381,008 B1* | 8/2019 | Ho | G06F 16/90332 |
| 10,489,463 B2* | 11/2019 | Potharaju | G06F 16/93 |
| 2003/0110413 A1* | 6/2003 | Bernklau-Halvor | G06F 11/2294 714/25 |
| 2007/0043844 A1* | 2/2007 | Sakai | H04L 41/12 370/310 |
| 2007/0192085 A1* | 8/2007 | Roulland | G06F 16/3329 704/9 |
| 2007/0208837 A1* | 9/2007 | Tian | G06F 3/1232 709/223 |
| 2008/0095327 A1* | 4/2008 | Wlasiuk | G10L 15/1822 379/88.01 |
| 2008/0294423 A1* | 11/2008 | Castellani | G06F 16/3329 704/4 |
| 2010/0125753 A1* | 5/2010 | Gadher | G06F 11/008 714/26 |
| 2010/0318847 A1* | 12/2010 | Beg | G06F 11/079 714/E11.178 |
| 2011/0112827 A1* | 5/2011 | Kennewick | G10L 15/22 704/226 |
| 2012/0303790 A1* | 11/2012 | Singh | H04L 43/0811 709/224 |
| 2013/0067023 A1* | 3/2013 | Joy | H04L 63/0421 709/217 |
| 2013/0198412 A1* | 8/2013 | Saito | H04L 61/2015 709/245 |
| 2014/0136013 A1* | 5/2014 | Wolverton | B60W 50/10 701/1 |
| 2015/0066479 A1* | 3/2015 | Pasupalak | G06F 16/90332 704/9 |
| 2018/0013500 A1* | 1/2018 | Liao | H04W 24/08 |
| 2018/0032890 A1* | 2/2018 | Podgorny | G06Q 30/016 |
| 2019/0005422 A1* | 1/2019 | Lee | G06Q 10/0639 |
| 2020/0134188 A1* | 4/2020 | Bagheri | G06F 21/577 |
| 2020/0151583 A1* | 5/2020 | Mueller | G06Q 30/016 |
| 2021/0158814 A1* | 5/2021 | Hussain | G06F 3/167 |

OTHER PUBLICATIONS

Reddit.Com, 'Mesh test results', Posted by jwnpgh on Apr. 22, 2018 (Year: 2018).*
Extended Search Report from counterpart European Application No. 21182585.6 dated Nov. 26, 2021, 8 pp.

* cited by examiner

| 1220 | OS | OS Vector | AP | AP Vector | UserID | UserID Vector |
|---|---|---|---|---|---|---|
| Item | | | | | | |
| 1221 Mojave | x | 13,4,67,90 | | | | |
| 1222 iOS | x | 89,34,55,2 | | | | |
| 1229 ..... | x | | | | | |
| 1231 AP 13 | | | x | 34,346,3,63 | | |
| 1232 Mist | | | x | 12,3,46,7 | | |
| 1233 Mist 182 | | | x | 76,351,2,36 | | |
| 1237 ..... | | | x | | | |
| 1239 ....... | | | x | | | |
| 1242 John smith | | | | | x | 764,45,2,19 |
| 1243 Sally brown | | | | | x | 86,91,63,4 |
| 1249 ....... | | | | | x | |

ENHANCED CONVERSATION INTERFACE FOR NETWORK MANAGEMENT

FIELD

The present application relates to the management of communication networks, and, more particularly, to methods and/or apparatus for providing an enhanced natural language conversation user interface for a network management system.

BACKGROUND

Users of complex networks, such as enterprise networks, encounter degradation of a system level experience (SLE), which can result from a variety of issues. To support such networks and resolve issues as they arise, numerous sophisticated tools have been developed that analyze and diagnose problems with these networks based on a variety of log data and statistical information associated with how the network is operating. An example of such a tool is a virtual network assistant (VNA) tool provided by Juniper Networks, Inc. The VNA utilizes machine learning, information theory and Bayesian statistics when identifying a root cause of a network issue. The VNA also provides, in at least some circumstances, mitigation of a network issue by prompting manual procedures or automatically, without human assistance, implementing corrective measures.

Use of network devices is common place in enterprises and in other public places. Typically, when a user of a network device experiences degradation of a service level, they contact a support group to resolve the issue. However, these support groups must be funded, and can often represent a substantial expense to an organization providing those funds. Thus, techniques to reduce the burden on support groups when supporting a network would reduce expenditures and increase return on capital.

BRIEF DESCRIPTION OF THE FIGURES

The embodiments herein may be better understood by referring to the following description in conjunction with the accompanying drawings in which like reference numerals indicate identically or functionally similar elements, of which:

FIG. 12 illustrates an example of a simplified lookup table 1200 in accordance with one or more embodiments.

DETAILED DESCRIPTION

Figure 1A:
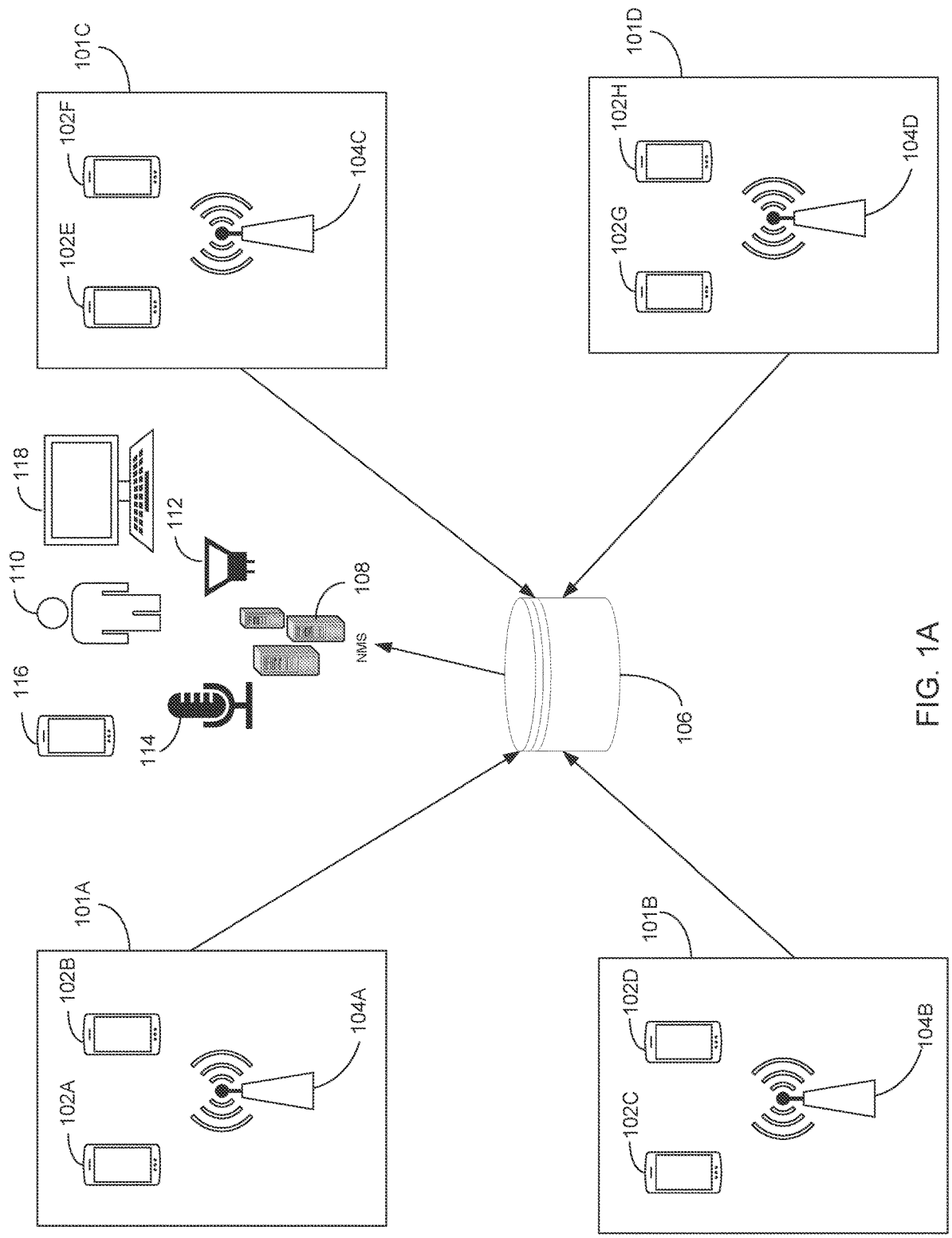
FIG. 1A is an overview diagram of a system implementing one or more of the disclosed embodiments.

Described are embodiments of a network management system. The network management system provides for diagnostics and/or troubleshooting of a remotely managed multi-site network. The multi-site network includes, in various embodiments, one or more of wireless networks, wired networks, or optical networks. Some embodiments provide for the diagnostics and/or troubleshooting via voice commands. In these embodiments, responses to voice commands are conditioned on a present state of the multi-site network. The present state of each site is reflected in a centralized data store. This centralized data storage serves as a data source for satisfying the natural language queries.

In some embodiments, a natural language processor (NLP) receives a verbal query and separates the query into at least two components, an intent and an entity. The intent is a "verb" of the NLP query, and can include, in various embodiments, a "list" verb, or a "troubleshoot" verb. The entity is a subject of the verb. Thus, if the verbal command is "list all APs", the entity is "all APs" and the intent is "list."

The disclosed embodiments utilize a context sensitive approach to interpreting the entity provided by the natural language processor. For example, in some cases, natural language commands are ambiguous. A command to "list unhappy devices" can require a first set of criterion be evaluated against a first type of device, and a second set of criterion to be evaluated against devices of a second type. In other words, "happiness" of a mobile phone is defined differently than happiness of a wireless access point, for example. The disclosed embodiments recognize context sensitive differences such as these by providing criterion for "happiness", or other conditions, that vary based on a type of device for which information is being queried. Additional ambiguity is presented when a term has multiple meanings. As one example, "Lisa" is both a name of a person and also a name of a computer. Thus, a command such as "What is Lisa's status" is subject to several interpretations. For example, if a user connected to the multi-site wireless network is named "Lisa," the query may be interpreted to be requesting a status of the user itself. The status of the user Lisa needs to be evaluated based on a first set of criterion. If a computer named "Lisa" is also connected to the multi-site wireless network, status of the computer needs to be evaluated under a second set of criterion. The disclosed embodiments handle this ambiguity by applying the different criterion to evaluate "Lisa's" status.

Some of the disclosed embodiments further refine responses to a voice command based on results of the queries themselves. In some cases, query responses indicating exception conditions, such as low service level experience (SLE), are prioritized higher than other query responses indicating nominal conditions. In the example above, some embodiments collect status information for both a user named "Lisa" and a computer named "Lisa." These embodiments then evaluate the collected status information to determine whether the status information indicates exception conditions or nominal performance. Based on this classification of the status information, the two interpretations are ranked, and a response is provided based on the ranking. Thus, for example, status information indicating an exceptional condition is ranked more highly than status information indicating nominal conditions, and thus forms a basis for a response to a query.

Below are a few examples of the interaction between a user and embodiments of the network management system.

Example 1:
   Verbal input: "list Mojave devices"
   intent=>"list"
   entity=>"Mojave"
   fuzzy search ("Mojave") against a data store (e.g. data store 106).
   Fuzzy search returns an indication that Mojave references a "mobile client OS"
   From "mobile client OS", the disclosed embodiments infer the following properties:
   entity_type=>mobile client
   property type=>OS
   property value=>Mojave The disclosed embodiments then construct a query to obtain a list of matched results. In the example above the user enters a query requesting a list of Mohave devices. The intent is identified as "list" and the entity is identified as "Mohave". The entity (e.g., Mohave) is then used to perform a fuzzy search against the data store 106. Results of the search indicate that Mohave is an OS of a client. An inference is then made that an entity_type is a mobile client, the property is OS, and the property value is Mojave. Using this understanding of the query, some of the disclosed embodiments interpret that the requested listing is a listing of mobile devices that use the Mohave OS. This understanding helps build a parameter list that is passed to a query tool that performs a search against one or more data stores. Some embodiments rely on a configuration file or data store to obtain a list of mobile clients that have Mohave as their OS.

Example 2:
   User input: "troubleshoot Mojave devices"
   intent=>troubleshoot
   entity=>Mojave
   fuzzy search (Mojave) against a data store (e.g. data store 106)
   fuzzy search results indicate that Mojave is a client operating system
   Entity inference:
   entity_type=>mobile client
   property type=>os,
   property value=>Mojave Based on this information, some of the disclosed embodiments construct a query to obtain a list of matched results. In example 2, a user enters a query requesting to troubleshoot Mohave devices. The intent is identified as "troubleshoot" and the entity is identified as "Mohave." A fuzzy search is performed on "Mohave" against a data store. Results of the search indicate that Mohave is an OS of a client. An inference is then made that the entity_type is a mobile client, the property is OS, and a value of the property is Mojave. Using this understanding of the user input, the disclosed embodiments interpret that the requested listing is a listing of issues related to mobile devices that use the Mohave OS. This understanding helps sharpen the intent and after obtaining the list of the Mohave devices from the data store, the disclosed embodiments invoke a query tool to obtain data related to the performance of devices running the Mohave OS. In various embodiments, information presented to the user depends on a number of items found to match the search criteria of mobile clients with Mohave as their OS. If the search results indicate there no devices with a Mohave OS, the some embodiments display a message stating "I can't find any Mojave client. Can you tell me more about the device you want to troubleshoot?" If the search results indicate that there is only a single device with a Mohave OS, some embodiments invoke one or more additional query tools to obtain more information regarding a root-cause of issues affecting performance of the specific device. Results from these additional invocations are then displayed.

In some embodiments, if search results indicate there are less than a predefined threshold number of devices (e.g., three (3)) with a Mohave OS, again additional tools are invoked, at least in some embodiments, to determine root-causes of any issues affecting performance of these specific devices. A response to the user is then provided based on information obtained from these additional invocations. Some embodiments allow a user to select from a list of identified devices, and then additional querying is performed based on the selected device.

In some embodiments, if search results indicate more than a predetermined number of qualifying devices, additional devices, a summary report of those devices is prepared. For example, in some embodiments, one or more query tools are invoked to obtain information relating to root cause of issues affecting these devices, including history information relating to these devices. The summary report then includes history and status information for devices that have a Mojave OS. An example of such dialog is "I found ten Mojave devices, one was rebooted, two devices have recent configuration changes, three devices have AP health issues. Is there specific device you would like to troubleshoot further?"

Example 3:
   User input: "troubleshoot AP43."
   intent=>troubleshoot
   entity=>AP43
   The disclosed embodiments then perform a fuzzy search on "AP43" against a data store. The fuzzy search returns data indicating that AP43 corresponds to an AP model name property in the data store.
   From the AP model name property, an inference is made as outlined below:
   Entity inference:
   entity_type=>AP
   property type=>model
   property value=>AP43
   construct query to get the list of matched results In example 3, the user enters a query requesting to troubleshoot an AP named AP43. The intent is identified as "troubleshoot" and the entity is identified as "AP43". A fuzzy search is performed on the entity "AP43" against a data store. The fuzzy search identifies that AP43 is an AP model name property. The search results thus indicate that the user wants to troubleshoot APs of a specific model (e.g. AP43). Based on the AP model name property, some of the disclosed embodiments construct a query to a troubleshoot tool. The query includes parameters, with the parameters causing the troubleshooting tool to obtain status information related to the issues affecting the operations of APs having model name properties corresponding to "AP43."

If the troubleshooting tool provides output indicating there are no devices, e.g., APs, with this specific model name property value, some embodiments display a message stating "I can't find any devices of model AP43. Can you tell me more about the device you want to troubleshoot?" If the troubleshooting tool output indicates there is only a single device with an AP model name property value equivalent to "AP43," some embodiments perform a second invocation of the troubleshooting tool again or a different troubleshooting tools to obtain additional root-cause information relating to issues associated with the single device. An output is then generated that is derived from output of this second invocation.

If a query of the data store indicates that a number of devices having an AP model name property equivalent to "AP43," is within a predefined range, some embodiments invoke a troubleshooting tool to obtain information relating to root causes of issues that affect the performance of APs having the model name. Some embodiments then display a message derived from the information relating to root causes.

In some embodiments, a UI is presented that allows a user to select one of the devices, and then additional detail is provided. In some embodiments, the natural language processor provides for commands that allows the user to select one of the devices verbally.

If the number of devices identified from the data store exceeds a predetermined threshold, some embodiments generate a summary report instead of providing details troubleshooting information on each device. In some embodiments, the summary report take the form of "I found ten APs of model AP43, one of them was rebooted, two have a recent configuration change, three were attached to a switch which has issues. Is there specific one you want to debug further?"

In a similar example, a large number of APs are configured to have numerical names such as AP1, AP2, . . . AP78. The naming of the APs in this example presents ambiguity as to whether AP43 refers to an AP model name property value or an AP name property value. Given this ambiguity, a fuzzy search for AP43 indicates that "AP43" is either an AP model name property value or an AP identity name (ID) property value. Some embodiments then generate a dialog, based on this ambiguity, indicating, for example" "I found 10 APs of model AP43, 1 of them was rebooted, 2 have configuration change, 3 were attached to a switch which has issues. In addition, I found one AP named AP43. Is there specific AP you want to debug further?" Thus, summary information for each device identified via either the AP model name property or the AP identity name property is provided.

Example 4

User input: "unhappy users on iOS in the last 7 days"
intent=>unhappy_user
entity=>last 7 days
entity=>iOS Some embodiments determine, based on a user browser's time zone, that 'last 7 days' is translated to start_epoch and end end_epoch. The disclosed embodiments then perform a fuzzy search of ("iOS") and determine that iOS matches a client device operating system property value. Because the intent is unhappy users, the system interprets this as a troubleshooting intent and a parameter set of a query tool is generated to request devices having an SLE that indicates poor or at least below nominal performance. An inference is then made that the query is requesting information on any devices having the identified operating system name as an entity property value. A search tool is invoked, and parameters passed to it that collects information of devices matching this inference. An output is then generated that is derived from the results.

If no iOS devices are identified that have SLE's indicating sub-nominal performance, a message is displayed or voiced back to the user such as "I did not identify any unhappy iOS devices in the last seven days".

Other example intents implemented by one or more of the disclosed embodiments include but are not limited to:

failure_timelines: provides a device's error events in time dimension mutual_information: provides mutual information about a specific property.

impact_scope: This intent identifies a scope of an issue, such as the impacted components, users, OS, device type, WLAN, radio band, etc.

inform: This intent provides a single word input, which causes multiple searches to be performed in parallel. For example if the user enters "mist-office" some of the disclosed embodiments provide a response indicating a list of search results such as AP (mist-office-lobby), Site (mist-office-Cupertino). In some embodiments, if the user enters: [webhook], some embodiments generate a response providing results of a semantic search for a company's FAQ documents.

troubleshoot: this command causes some of the disclosed embodiments to provide a response indicating information from a troubleshooting tool, such as a virtual network assistant. The troubleshooting tool is invoked with a parameter set that is determined by the entity that accompanies the intent in the verbal command.

restart: This intent causes the conversation context to return to an initial state.

rank_ntwk-element: An example invocation of this intent is "rank_dns_server." In response to this intent, some embodiments rank domain name service (DNS) servers based on their activity. A response is generated to this intent based on the ranking. For example, some embodiments output names of a list of more active DNS servers, with activity based on a number of DNS requests satisfied during a predetermined elapsed time period.

unhappy_client: Some embodiments generate, in response to this intent, a list of client devices in an organization, with client devices in the list being based on an error rate associated with the client device.

troubleshoot_application: Some embodiments trigger, in response to this intent, invocation of a troubleshooting application for a particular application. For example, some applications implement troubleshooting command line options, which are invoked, in some embodiments, in response to this intent.

FIG. 1A is an overview diagram of a system implementing one or more of the disclosed embodiments. FIG. 1A shows a plurality of network sites, network site 101A, network site 101B, network site 101C, and network site 101D. Each of the network sites includes one or more access points. FIG. 1A shows example deployments that each include one access point. For example, FIG. 1A shows a network site 101A includes access point 104A, network site 101B includes access point 104B, network site 101C includes access point 104C, and network site 101D includes access point 104D. Each network site also includes one or more devices connected to its respective access point. For example, network site 101A includes device 102A and device 102B, which communicate with access point 104A. Network site 101B includes a device 102C and a device 102D, which are both in communication with access point 104B. Network site 101C includes a device 102E and a device 102F, both of which are in communication with access point 104C. Network site 101D includes a device 102G and a device 102H, both of which are in communication with access point 104D. Device information from each of the network sites is stored in a data store 106. In some embodiments, user information and/or document information relating to one or more of the network sites 104A-D is also stored in the data store 106. In some embodiments, a network agent running at each of the network sites 101A-D scans the local network and uploads new information, such as device, user, or document information, to the data store 106. Thus, for example, if a new user attaches to a network site, the agent detects the new user and uploads property information of the new user to the data store 106. Similarly, if a user detaches from a network site, the agent detects an absence of the user and either removes information regarding the user from the data store 106, or marks the user as inactive on the site.

The device information provided to the data store 106 defines property values for a plurality of properties. The properties include properties of devices communicating at the respective network site. For example, the properties include one or more of device host names, device, address information, device model information, device operating system type information, device bios version information, device resident application information, or other properties, as discussed further below. This information is periodically, or otherwise provided to the data store 106 on an ongoing basis. This periodic or recurring upload of information from each of the network sites 101A-D to the data store 106 provides for a dynamic set of data being available in the data store 106. Thus, for example, when a device having particular property values connects to (or is added to) a network at one of the network sites 101A-D, that information is reflected, after some intermediate delay, in the data store 106. Devices that are managed by the disclosed embodiments include, in various embodiments, one or more of a network switch, a router, a wireless access point, mobile devices such as smart phones, laptops, desktop computers, printers, scanners, copy machines, or other electronic devices that have an ability to attach and/or connect to a computer network. When that device leaves (or is removed from) the network, the information is removed from the data store 106 after some relatively small delay. Thus, the data store 106 reflects property information for devices operating at each of the network sites 101A-D.

The network sites 101A-D are managed remotely via a network management system 108. The network management system 108 implements, in some embodiments, a voice response system that allows a user 110 to issue commands via a microphone 114, and receive responses via a speaker 112. In some other embodiments, the user 110 interacts with the network management system 108 via a display based user interface, which can be presented on a mobile device 116 or a console terminal 118.

Figure 1B:
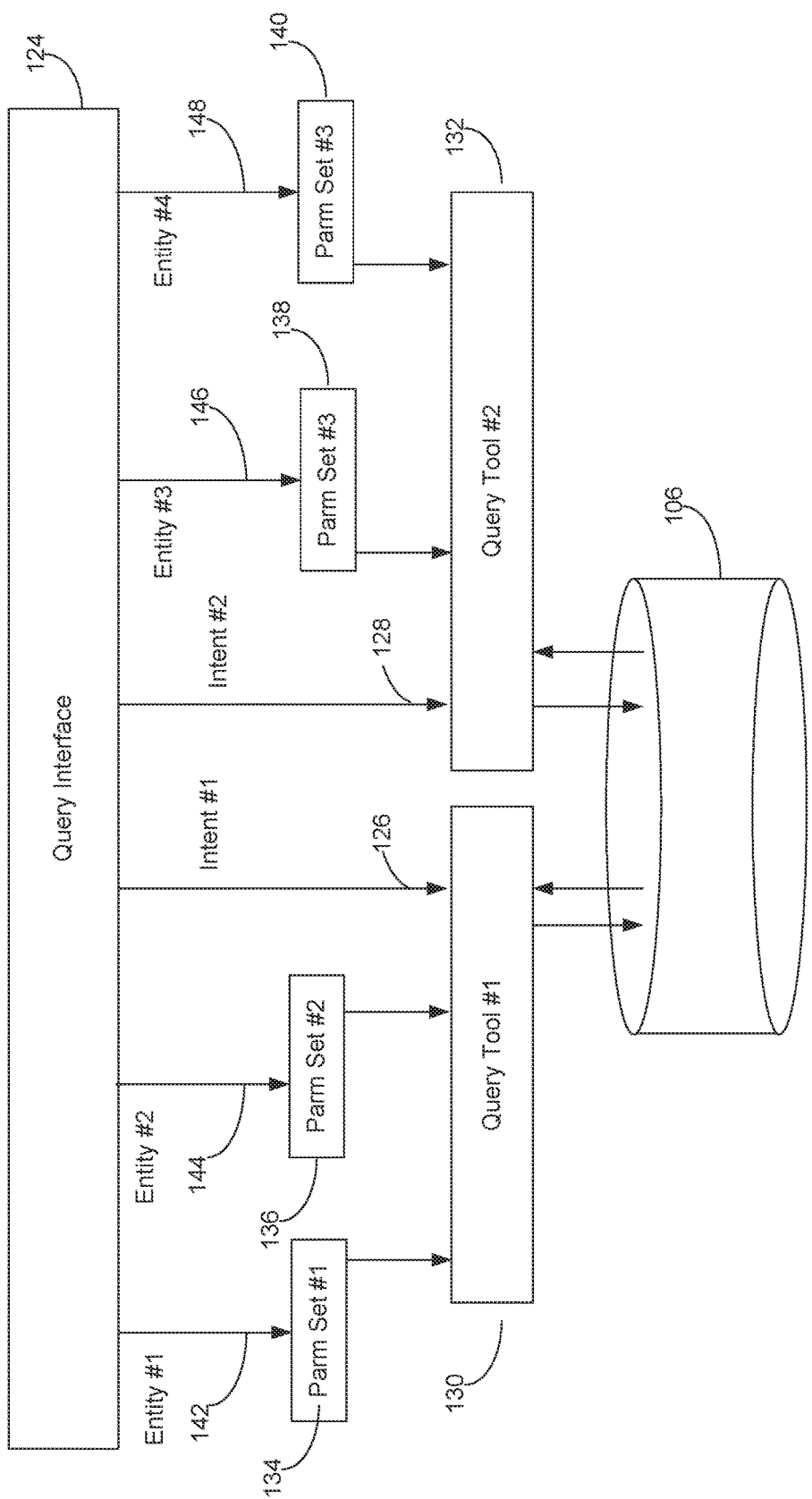
FIG. 1B shows an example data flow implemented in one or more of the disclosed embodiments.

FIG. 1B shows an example data flow implemented in one or more of the disclosed embodiments. FIG. 1B shows the data store 106 discussed above with respect to FIG. 1A. A query interface 124, which may be a natural language query interface or a chatbot, or a screen/keyboard interface, defines an intent of a query. The disclosed embodiments support multiple intents, two of which are illustrated in FIG. 1B as intent 126 and intent 128. The disclosed embodiments select different query tools based on each of the intents. Thus, if the query interface 124 issues a query including the intent 126, a first query tool 130 is selected. If the query interface 124 issues a query including the intent 128 (e.g. "troubleshoot"), a second query tool 132 is selected.

In some embodiments, a parameter set for the selected query tool is also generated. In some embodiments, the parameter set is generated based on the intent, and an entity associated with the query. As shown in FIG. 1B, if the intent 126 is issued by the query interface 124, includes a first entity 142, a first parameter set 134 is generated and provided to the selected query tool, i.e., the first query tool 130. If the query interface 124 generates the intent 126 with a second entity 144, a second parameter set 136 is generated and provided to the selected query tool (i.e., the first query tool 130).

If the query interface 124 issues the intent 128, a third parameter set 138 is generated if the query includes a third entity 146, and provided to the second query tool 132. If a fourth entity 148 is associated with the intent 128, a fourth parameter set 140 is generated. Both the first query tool 130 and the second query tool 132 operate on the data store 106, which as shown in FIG. 1A, receives property information from each of the sites 101A-D.

Figure 2:
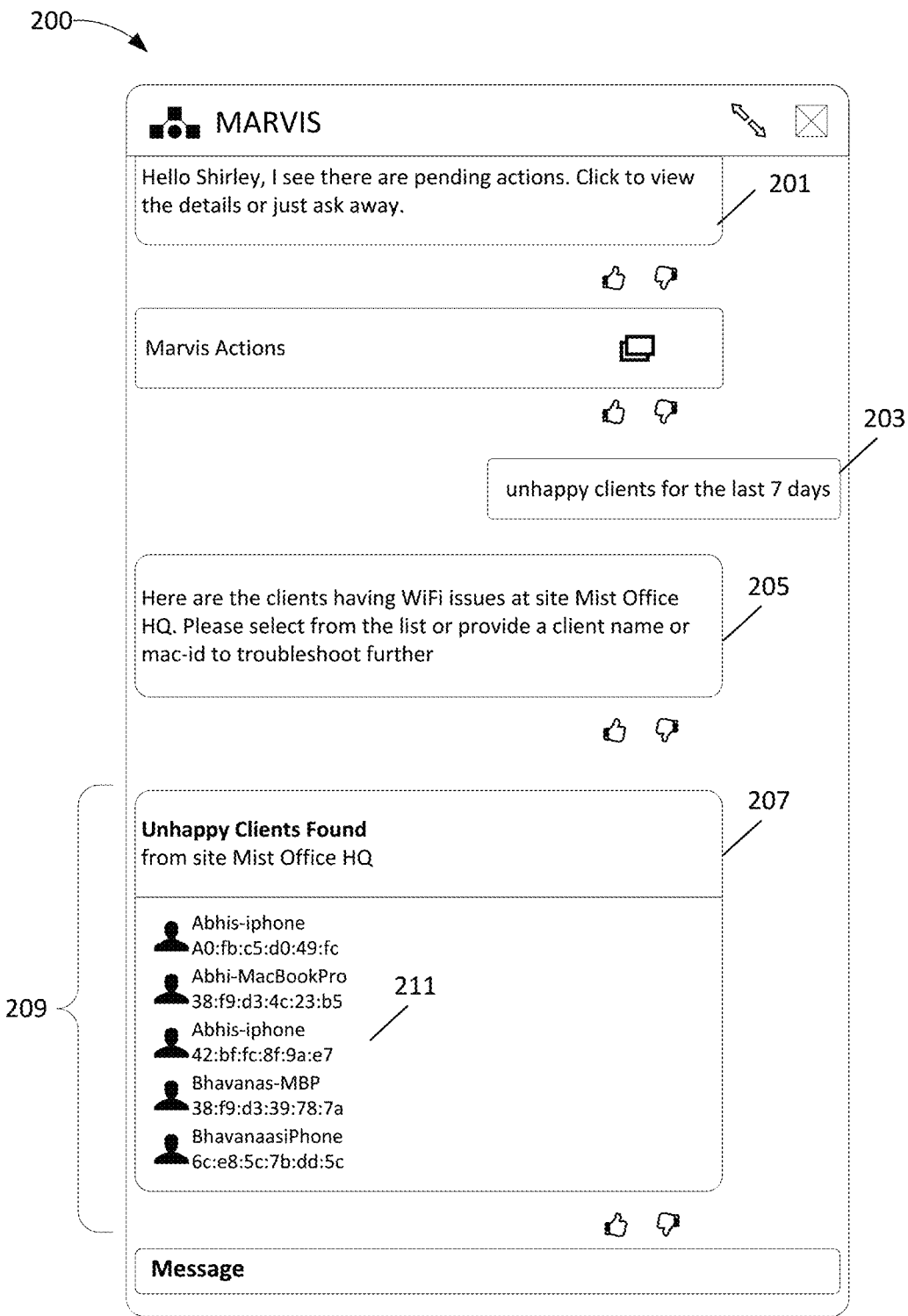
FIG. 2 shows an example user interface implemented in one or more of the disclosed embodiments.

FIG. 2 shows an example user interface implemented in one or more of the disclosed embodiments. The example user interface 200 displays a debugging session. The user interface 200 shows a welcome message 201. The user then enters a command 203 that includes an intent and an entity. In this case the intent is "unhappy" and the entity is "clients for the last seven days." As a result of the command 203, the disclosed embodiments generate a response 205 and 207 followed by message 209, which conveys names of the clients obtained from the VNA that experienced the issues. The message 209 includes a list of devices, including a region associated with each of the devices. A region 211 associated with the device "abhis-phone" is shown in FIG. 2.

Figure 3:
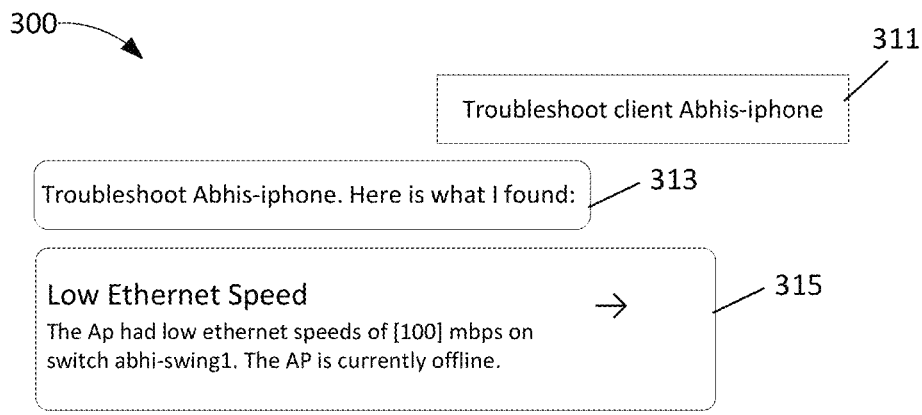
FIG. 3 illustrates dialog output of an example troubleshooting session in one or more of the disclosed embodiments.

FIG. 3 illustrates dialog output 300 of an example troubleshooting session in one or more of the disclosed embodiments. FIG. 3 shows a user entering a command 311. Alternatively, in some embodiments, the command is provided by selecting an entry identifying the specific client identified in the command 311. For example, in some embodiments, the command 311 is entered by a user by selecting an appropriate area of the message 209, such as the region 211, discussed above with respect to FIG. 2.

In response to the command, some of the disclosed embodiments query the data store 106 of FIG. 1A, via a query tool appropriate for an intent included in the command, to obtain parameter values associated with the identified client. From these parameter values, some of the disclosed embodiments are able to identify one or more issues with the identified client. FIG. 3 shows presentation of a first message 313 followed by information 315 conveying a root cause of the issue experienced by the identified client.

Figure 4:
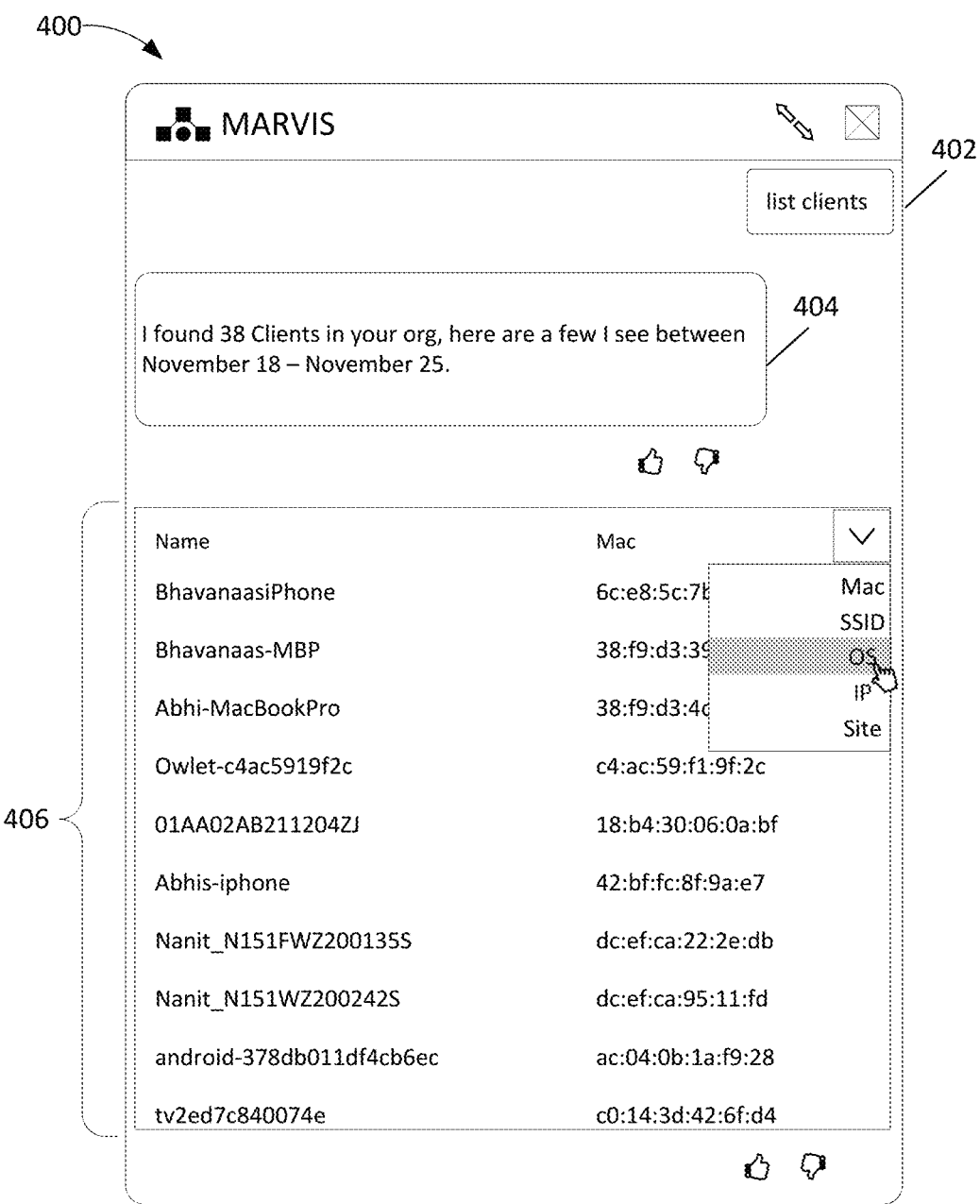
FIG. 4 illustrates an example query session implemented by one or more of the disclosed embodiments.

FIG. 4 illustrates an example query session implemented by one or more of the disclosed embodiments. The example query session of FIG. 4 shows a query message 402 asking for the list of clients. The example query session 400 then displays a message 404 indicating 38 clients were identified. A second message 406 conveys names of the identified clients obtained from the data store 106. If the second message 406 does not fit on the screen, the query session 400 provides the user with the ability to swipe the display up or down to view the additional clients.

Figure 5:
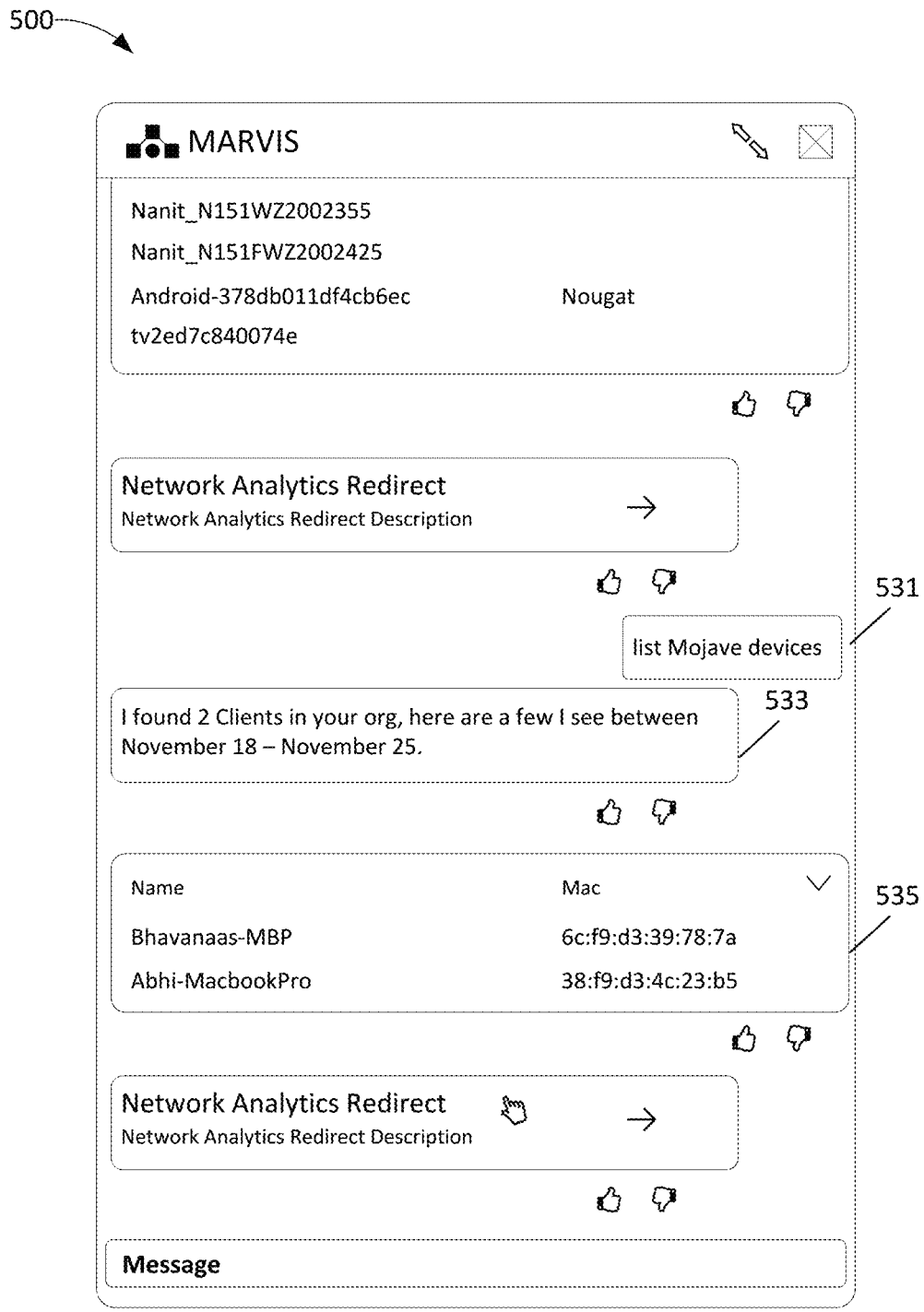
FIG. 5 illustrates an example query session 500 implemented in one or more of the disclosed embodiments.

FIG. 5 illustrates an example query session 500 implemented in one or more of the disclosed embodiments. A command 531 asking for the list of Mojave clients. In response to the query message, the disclosed embodiments identify two clients with the Mojave OS. A first message 533 is presented followed by a second message 535 that includes names of the identified clients with Mojave OS.

Figure 6:
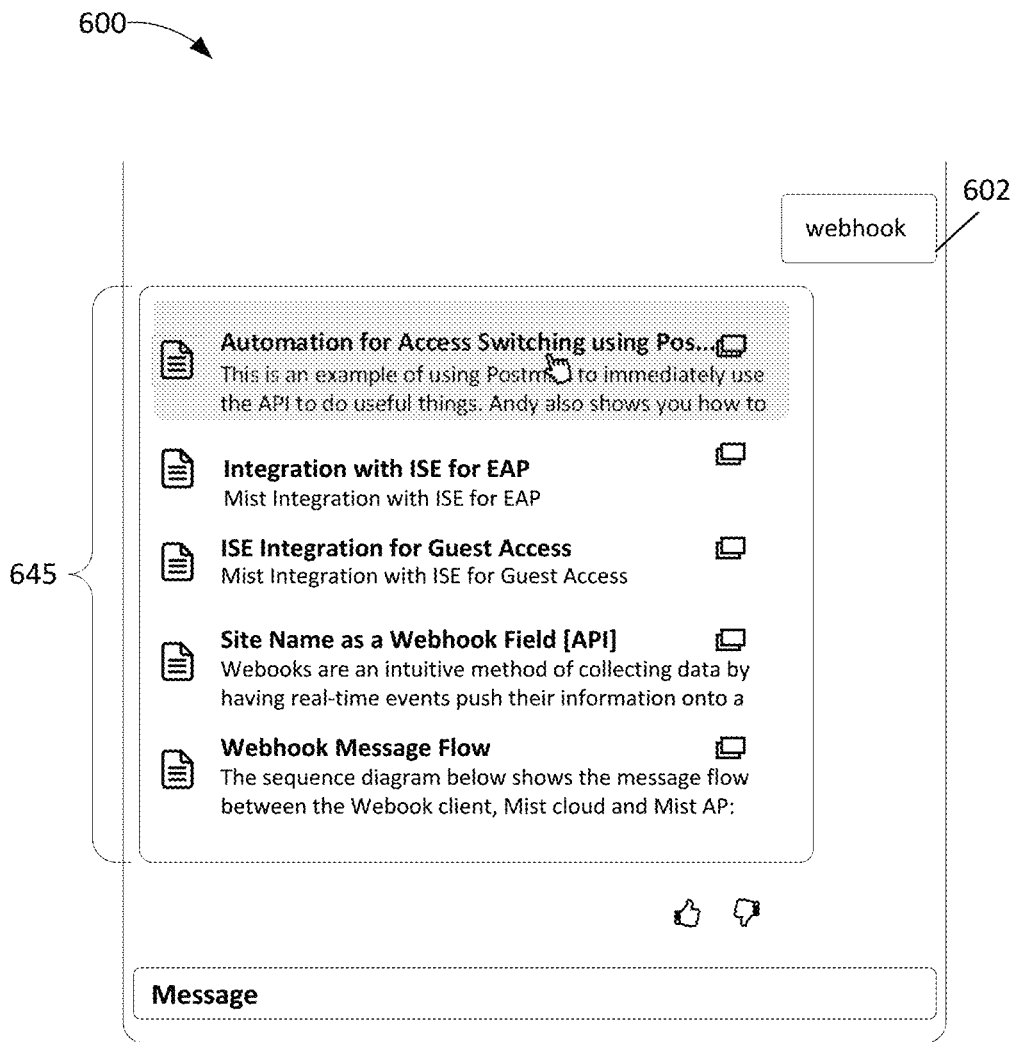
FIG. 6 illustrates an example query session 600 implemented in one or more of the disclosed embodiments.

FIG. 6 illustrates an example query session 600 implemented in one or more of the disclosed embodiments. A query message 602 indicating "webhook," requests a list of available reference documents. The example query session then displays information 645 conveying the names of the available documents. Some embodiments provide for selection of one of the available documents, and upon such selection, the document is opened.

Figure 7:
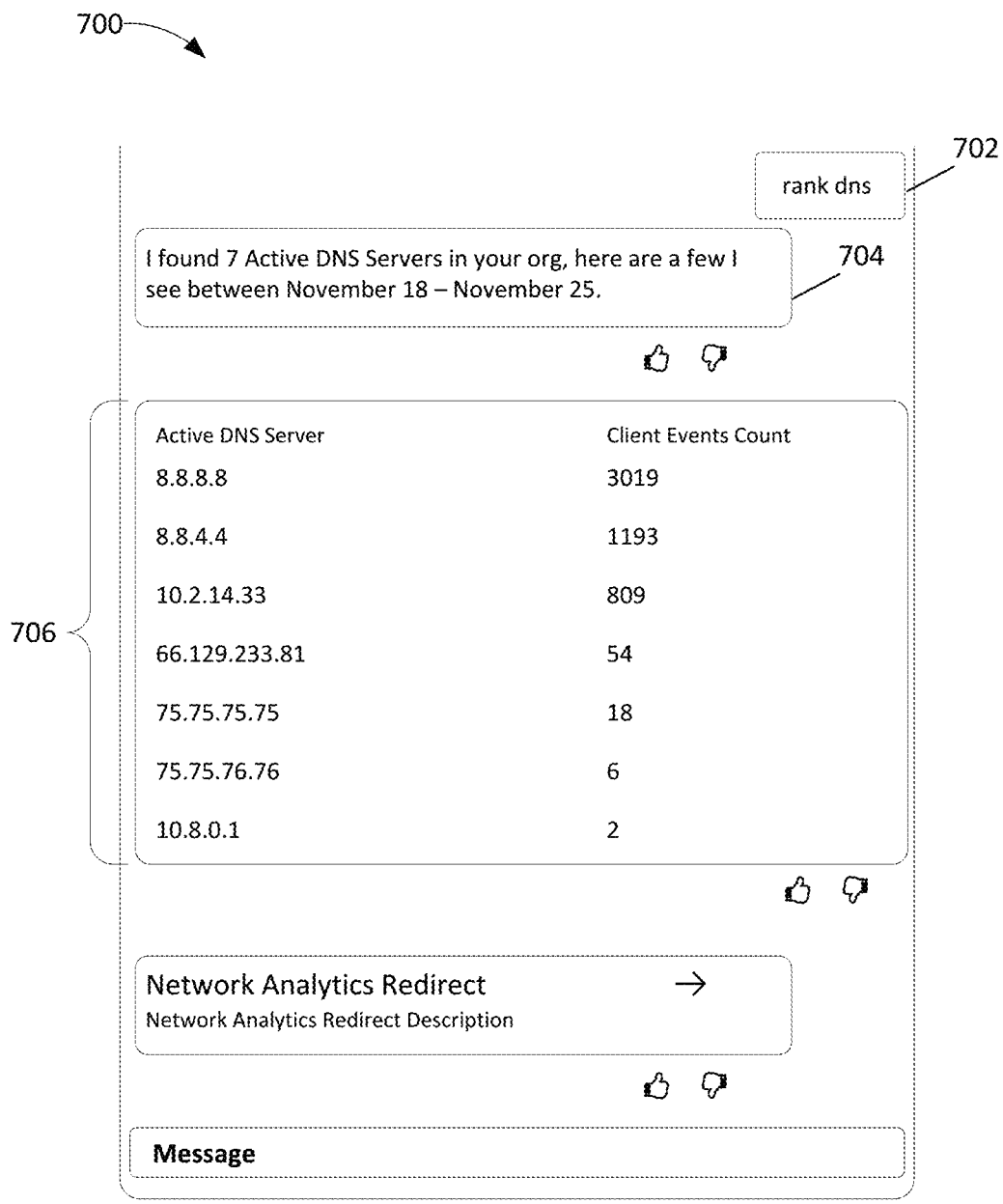
FIG. 7 illustrates an example query session implemented in one or more of the disclosed embodiments.

FIG. 7 illustrates an example query session implemented in one or more of the disclosed embodiments. FIG. 7 shows a response message 704 indicating a number of the most active DNS servers found in response to the command 702. The example query session 700 then displays a ranked list 706 of the DNS servers in descending order according to their level of activity.

To facilitate the above described functionality, some embodiments store property information discussed above with respect to FIG. 1A as vectors. The property values are encoded into vectors, in some embodiments, using off the shelf software tools such as Word2Vec. Thus, each of the property values can be represented as a position within a vector space that is mapped by the encoding. In the event that an exact match between an entity entered by a user and property values in the data store 106 is not identified, a property value nearest the queried entity in the vector space is determined. The matching property value nearest to the queried entity in the vector space is considered to be a match with the queried entity in some embodiments. In some embodiments, a match is only considered to be found if the distance is less than some predefined threshold.

Figure 8:
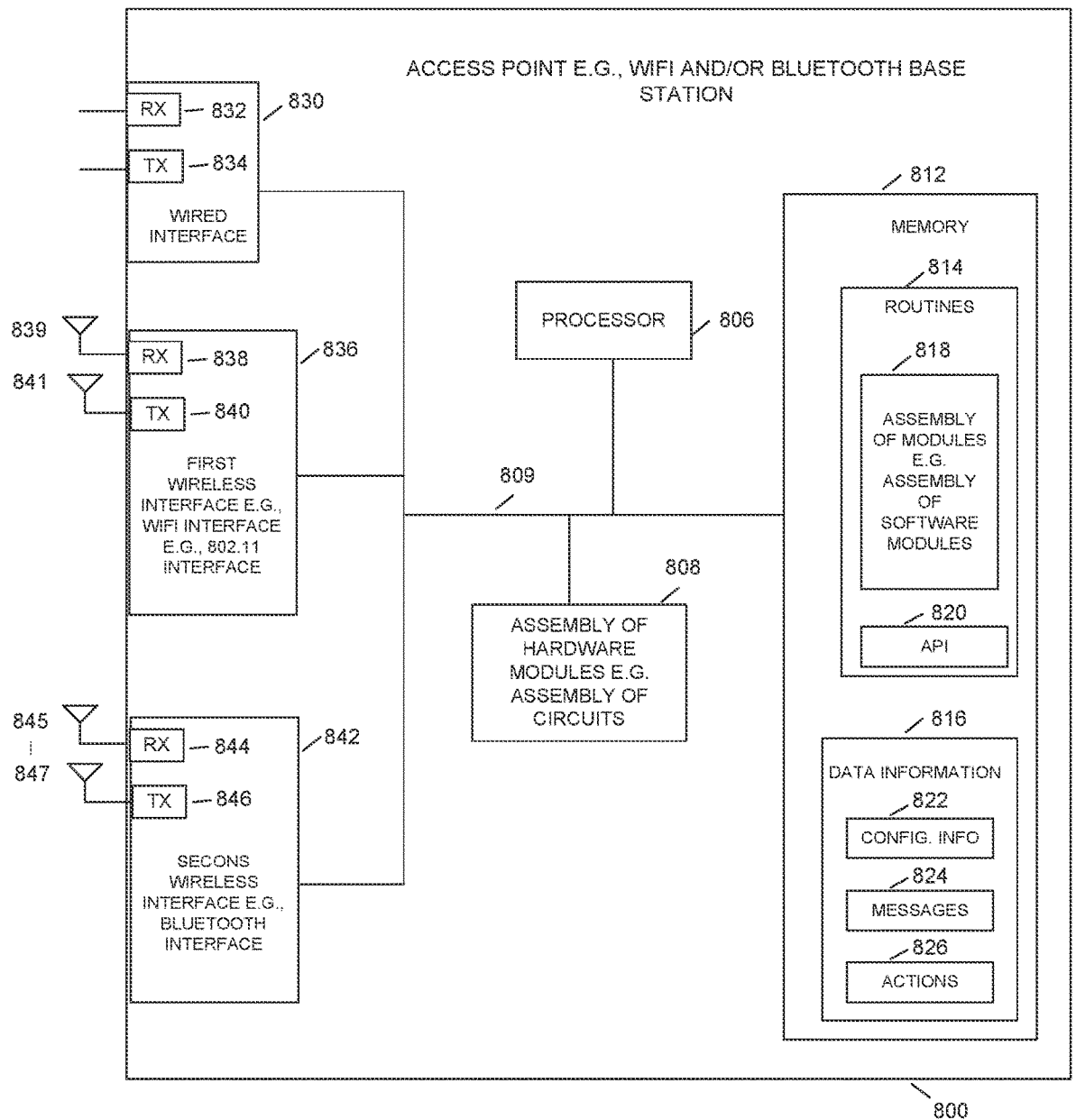
FIG. 8 is a block diagram of an example access point 800 in accordance with one or more of the disclosed embodiments.

FIG. 8 is a block diagram of an example access point 800 in accordance with one or more of the disclosed embodiments. In some embodiments, one or more of the access points 104A-D, discussed above with respect to FIG. 1A, implement one or more of the components described below with respect to FIG. 8.

The access point 800 includes wired interfaces 830, a first wireless interface 836, a second wireless interface 842, a processor 806, e.g., a CPU, a memory 812, and an assembly of modules 808, e.g., assembly of hardware module, e.g., assembly of circuits, coupled together via a bus 809 over which the various elements may interchange data and information. Wired interface 830 includes a receiver 832 and a transmitter 834. The wired interface couples the access point 800 to a network and/or the Internet. First wireless interfaces 836 may support a Wi-Fi interface, e.g. IEEE 802.11 interface, includes receiver 838 coupled to receive antenna 839, via which the access point may receive wireless signals from communications devices, e.g., wireless terminals, and transmitter 840 coupled to a transmit antenna 841 via which the access point may transmit wireless signals to communications devices, e.g., wireless terminals. Second wireless interface 842 may support Bluetooth® interface which includes receiver 844 coupled to receive antenna 845, via which the access point may receive wireless signals from communications devices, e.g., wireless terminals, and transmitter 846 coupled to a transmit antenna 847 via which the access point may transmit wireless signals to communications devices, e.g., wireless terminals.

Memory 812 includes routines 814 and data/information 816. Routines 814 include assembly of modules 818, e.g., an assembly of software modules, and an Application Programming Interface (API) 820. Data/information 816 includes configuration information 822, message event stream capture 824 and collection of remedial actions 826 to be taken in case of discovery of abnormal message flows.

Figure 9:
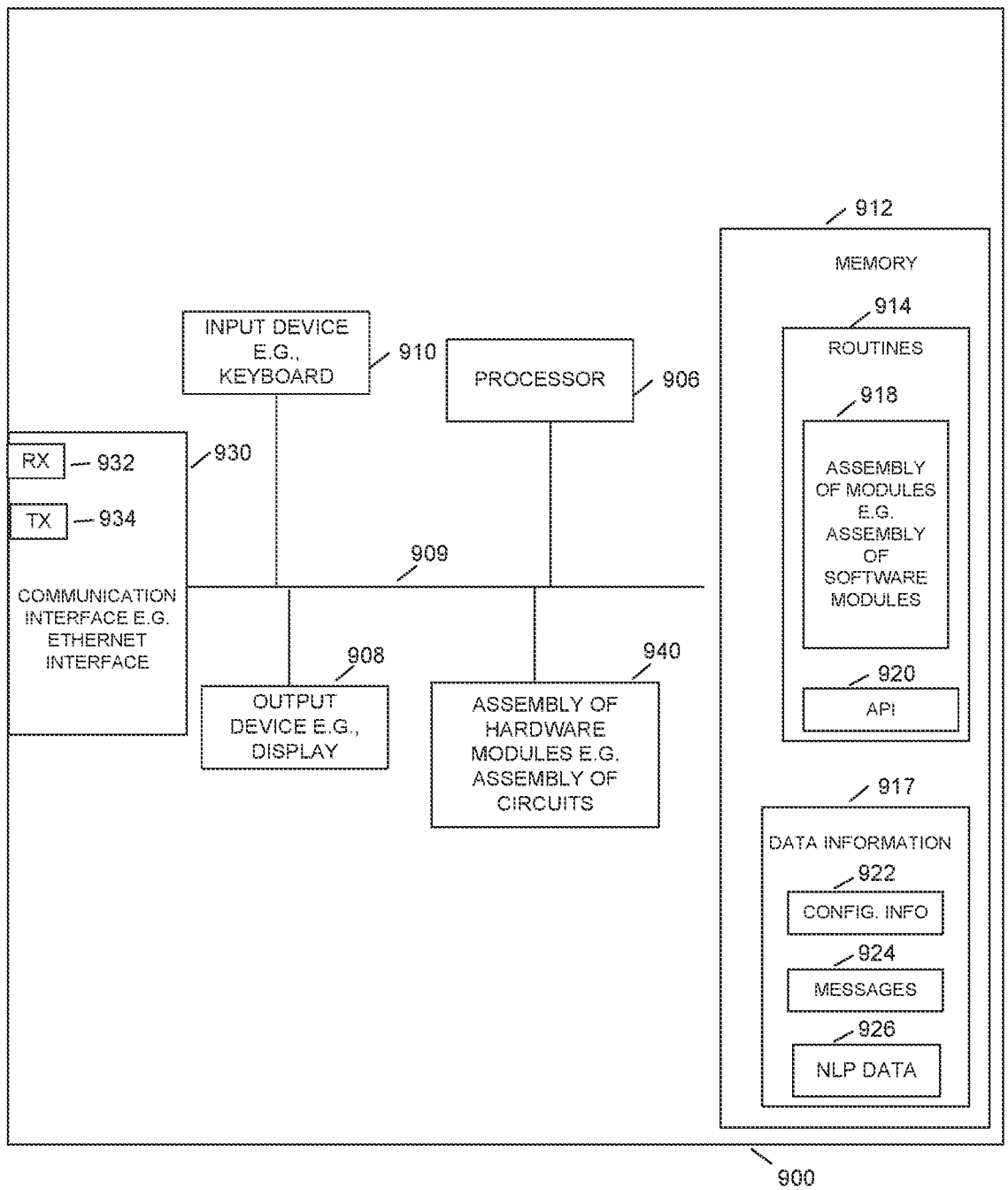
FIG. 9 is a block diagram of an example network management system 900.

FIG. 9 is a block diagram of an example network management system 900. In some embodiments, the NMS 108, discussed above with respect to FIG. 1A, implements one or more of the components of the network management system 900 discussed below with respect to FIG. 9.

The NMS 900 includes a communications interface 930, e.g., an Ethernet interface, a processor 906, an output device 908, e.g., display, printer, etc., an input device 910, e.g., keyboard, keypad, microphone, touch screen, mouse, etc., a memory 912 and an assembly of modules 940, e.g., assembly of hardware module, e.g., assembly of circuits, coupled together via a bus 909 over which the various elements may interchange data and information. Communications interface 930 couples the NMS 900 to a network and/or the Internet. Communications interface 930 includes a receiver 932 via which the network monitoring system can receive data and information, e.g., including service related information, e.g., message streams, connection time information, and success/failure related information from access points, e.g., for radio connection establishment, AA services, DHCP requests, Simple Notification Service (SNS) look-ups, and Web page requests, and a transmitter 934, via which the NMS 900 can send data and information, e.g., including configuration information and instructions, e.g., instructions to access points to restart, change transmission power, add SSID, etc.

Memory 912 includes routines 914 and data/information 917. Routines 914 include assembly of modules 918, e.g., an assembly of software modules, and Application Programming Interface (API) 920. Data/information 917 includes configuration information 922, captured message event stream 924 and collection of natural language processing (NLP) related data 926. In one example embodiment, a memory 912 includes the data store 106 of FIG. 1A.

Figure 10A:
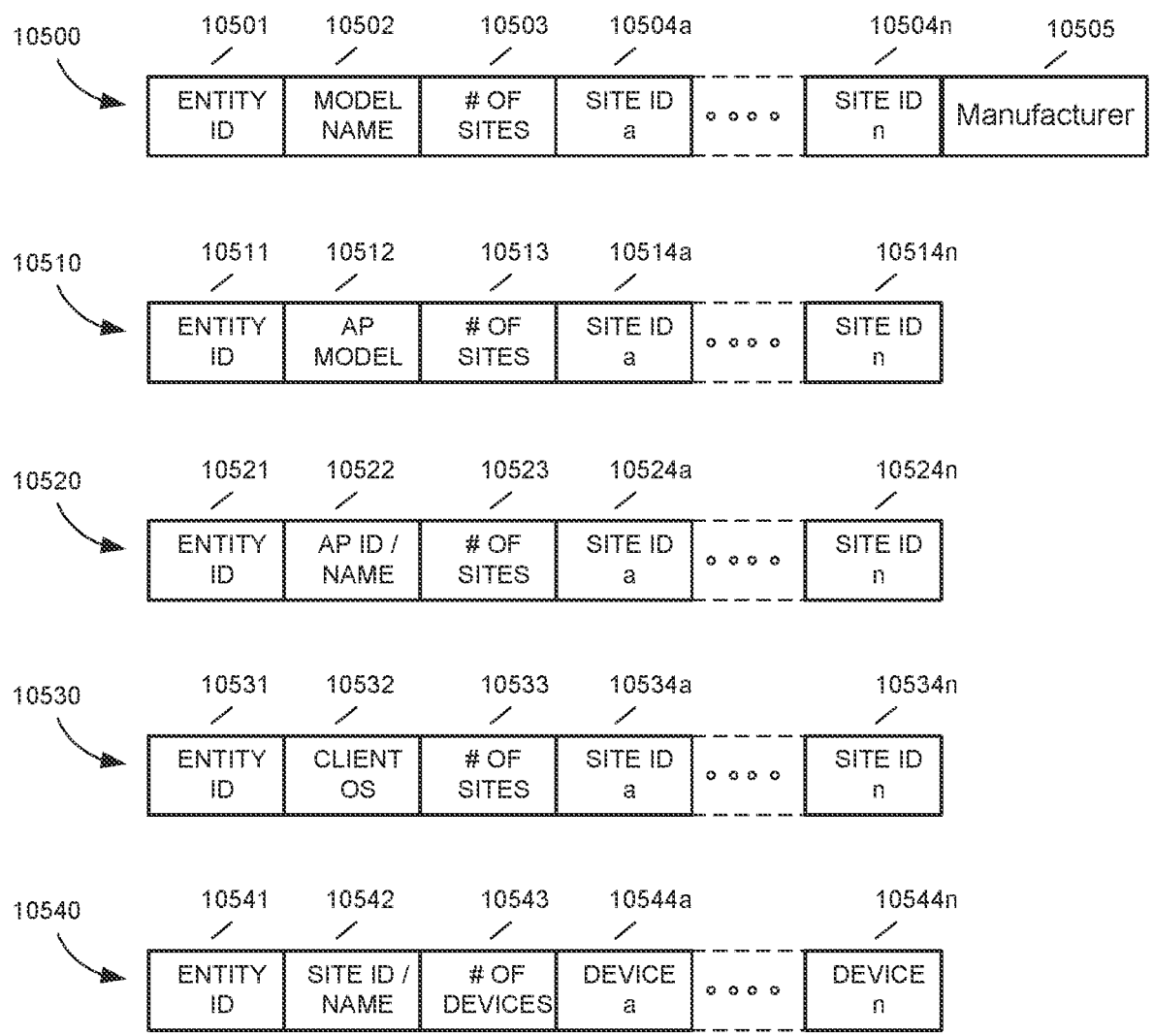
FIG. 10A-10C illustrate example data structures that are maintained by one or more of the disclosed embodiments.
Figure 10B:
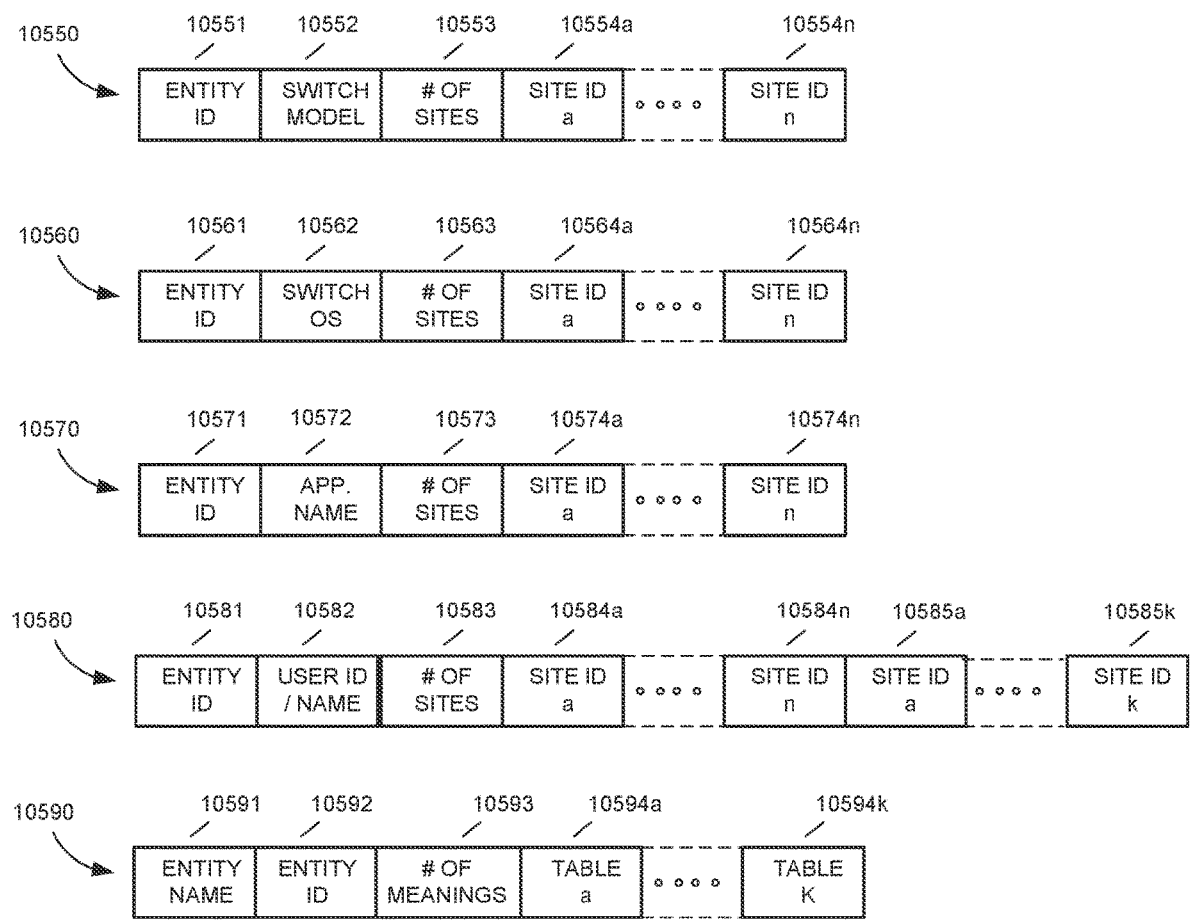
Figure 10C:
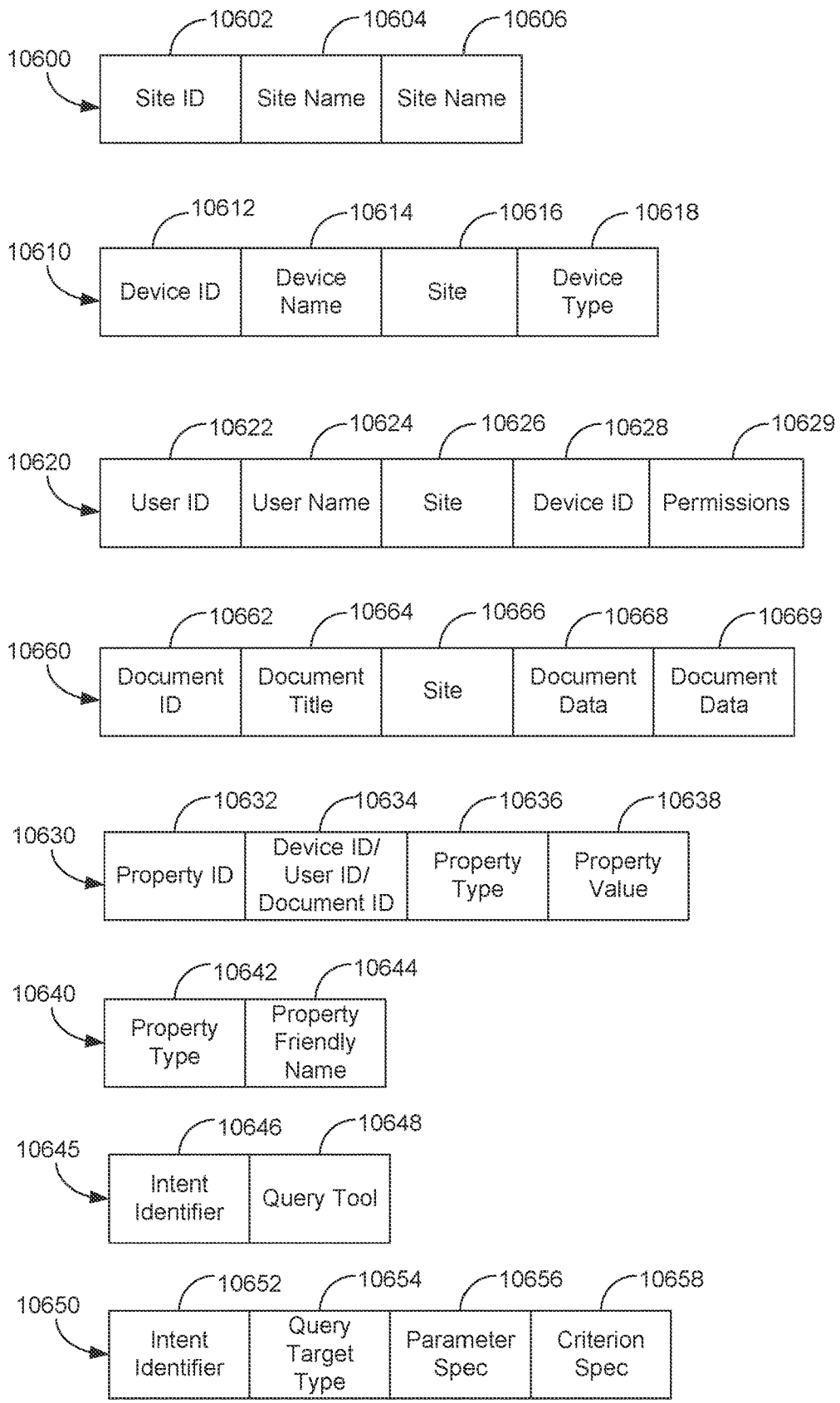

FIG. 10A-C illustrate example data structures that are maintained by one or more of the disclosed embodiments. While the data structures are described with respect to FIG. 10 as relational database tables, other embodiments utilize other data organization methods. For example, some embodiments utilize traditional in memory structures such as arrays or linked lists, trees, queues, graphs, or other data structures. In other embodiments, an unstructured data storage technology is relied upon. In some embodiments, one or more of the data structures discussed below with respect to FIGS. 10A-C are stored in the data store 106, discussed above with respect to FIG. 1A.

FIGS. 10A-B shows a mobile device model table 10500, an AP model name table 10510, an AP ID/name table 10520, a client operating system table 10530, a site table 10540, a switch model table 10550, a switch OS table 10560, an application name table 10570, a user ID table 10580, and an entity table 10590. Other information that is used for enhancing queries is stored in similar data structures. In other implementation some of the data fields are not utilized, while similar different data field are incorporated.

As discussed above, in some embodiments, property information from a plurality of network sites is collected in a data store (e.g. data store 106). The property information includes property values associated with one or more devices present or communicating at least of the network sites. These properties indicate one or more of names of users, user identifiers, manufacturer information for a device, software version information, installed application information, names of operating systems, names of devices (e.g. hostnames of devices and/or other device names), names of sites, or other information.

The mobile device model table 10500 includes an ID field 10501, an entity name field 10502, a number of sites 10503 where the device was detected, site IDs where device was detected 10504*a-n*, and a name of manufacturer 10505. In some embodiments, the table is kept up to date by dynamically updating it when a new device model is detected, when a new device model is detected at any specific site, or when a specific device model is no longer present at a specific site.

The AP model name table 10510 includes an entity id field 10511, an entity name field 10512, a number of sites 10513 where the AP model was detected, and site IDs 10514*a-n* where an AP was detected. In some embodiments, the AP model name table 10510 is kept up to date by dynamically updating it when a new AP model is detected, when a new AP model is detected at any specific site, or when a specific AP model name is no longer present at a specific site.

The AP ID/name table 10520 includes an entity ID field 10521, an entity name field 10522, number of sites 10523 where a device from this AP ID was detected, site IDs of sites where devices with this AP ID were detected 10524*a-n*. In some embodiments, the table is kept up to date by dynamically updating it when a new AP ID is detected, when a new AP ID model is detected at any specific site or when a specific AP ID is no longer present at a specific site.

The client operating system table 10530 includes an entity ID field 10531, an entity name field 10532, a number of sites 10533 field where a device with this OS were detected, and fields indicting the site IDs of sites where devices with said OS were detected 10534*a-n*. In some embodiments, the table is kept up to date by dynamically updating it when a new OS is detected, when a new OS is detected at any specific site, or when a specific OS is no longer present at a specific site.

The site table 10540 includes an entity ID field 10541, an entity name field 10542, number of devices in the site 10543, list of devices deployed on the site 10544*a-n*. In some embodiments, the table is kept up to date by dynamically updating it when a new site ID is detected when a new device is detected at any specific site or when a specific site ID is no longer associated with the network.

The switch model table 10550 includes an entity ID field 10551, an entity name field 10552, number of sites 10553 where this switch model was detected, site IDs where such switch model was detected 10554*a-n*. In some embodiments, the table is kept up to date by dynamically updating it when a new switch model is detected, when a new switch model is detected at any specific site, or when a specific switch model is no longer present at a specific site.

The switch OS table 10560 includes an entity ID field 10561, an entity name field 10562, number of sites 10563 where this switch OS was detected, site IDs 10564*a-n* where a switch model was detected. In some embodiments, the table is kept up to date by dynamically updating it when a new switch OS is detected, when a new switch OS is detected at any specific site, or when a specific switch OS is no longer present at a specific site.

The application name table 10570 includes an entity ID field 10571, an entity name field 10572, number of sites where this application was detected to be running 10573, site IDs where such application was detected 10574*a-n*. In some embodiments, the table is kept up to date by dynamically updating it when a new application is detected, when a new application is detected to be running at any specific site, or when a specific application is no longer present at a specific site.

The user ID table 10580 includes an entity ID field 10581, an entity name field 10582, number of sites where this user ID was detected 10583, site IDs where such user ID was detected 10584*a-n*, and the ids of the sites in which the users has privileges (a special symbol such as "all" is used for e.g., IT technician who has global privileges to view information from the sites) 10585*a-k*. In some embodiments, the table is kept up to date by dynamically updating it when a new user ID is detected, or when a new user ID is detected at any specific site, when a specific user is no longer present at a specific site, or when the viewing privileges of a specific user change.

The entity table 10590 includes an entity name 10591, an entity ID field 10592, the number of ways the entity can be interpreted 10593, and the address where the associated table per interpretation is located 10594*a-n*. For example, if the entity Mojave to be interpreted as: a) name of OS, b) name of a site, and c) user ID, the 10593 field will store the number 3 followed by the addresses 10594*a-c* of the associated tables a) address of the client operating system table 10530, b) address of the site table 10540, and c) user ID table 10580. In some embodiments, the table is kept up to date by dynamically updating it when a new entity is detected, or when the number of meanings associated with a specific entity changes.

In some embodiments, the user ID table 10580 is used to determine privileges of a user or session making a query. The privileges indicate from which sites the query, invoked by the said user, can obtain information. For example, the privileges indicate, in some embodiments, a session or user has access to property information of devices at a first site but not at a second site, other information indicative of the privileges associated with each user such as level of confidential information that can be shared with the user, is contemplated as well albeit, for sake of simplicity, is not shown in the figure.

This privilege information then defines which data is returned to the user/session in response to a query. For example, when table 10590 indicates that an entity is a value of an operating system name property, e.g., ("list Mojave devices"), in some embodiments, one of the fields 10594*a-k* identifies the table and specifically the address of the client operating system table 10530 which contains the names and IDs of all of the mobile device OSs. The system uses the entries 10534*a-n* to identify the sites in which the Mojave OS runs on mobile clients and for which the user has privilege to get information, indicated by entries 10584*a-k*.

In some embodiments, heuristics are used to infer that a) because the request is related to OS of mobile device then the request is about mobile clients. These embodiments then use this information, along with the fact that the entity was determined to be an OS named Mojave, to construct a query to the site table 10540, and obtain a list of Mojave devices at the specified sites for which the user is privileged to view information. The information is then presented to the user.

In accordance with another example (2), a request is received to "troubleshoot Mojave devices". The request is decoded as an intent to troubleshoot and an entity of Mojave." A fuzzy query is performed on the "Mojave" entity value, against the entity table 10590. From this search, some embodiments determine the request references a mobile device operating system property value. The field 10594 identifies a table providing information on mobile device operating system property values. One or more of table entries 10534*a-n* are referenced to identify sites to which the user has access and that include client devices running the Mojave OS.

In some embodiments, a heuristic is invoked to determine that because the request is related to a mobile device operating system name property value then the request is about mobile devices. Based on this inference, a query is constructed that invokes a troubleshooting tool. The troubleshooting tool obtains, based on the query, a list of Mojave devices that experience SLE degradation. The information is then presented to the user, either via a display or via audio.

It should be noted that since the intent was determined to be a request to troubleshoot the system, in some embodiments, the heuristics determine that a query is constructed using the entities obtained identified via fuzzy searches. The method constructs the query to the data store and or to a network analysis tool, which returns a list of Mojave clients with the lowest SLE including the root causes of the SLE degradation.

In accordance with another example (3), a command is provided as "troubleshoot AP43". The intent is identified as "troubleshoot" and the entity is identified as "AP43." A fuzzy query is run against the entity table 10590, searching for the "AP43" entity. Results of that search indicate that the request references either an AP model name "AP43" or a specific AP whose ID is AP43. The field 10593 indicates that there are two different meaning to the item "AP43" and the fields 10594*a-b* identify two tables, and specifically an address of a first table storing AP model names (e.g., AP model name table 10510), and an address of a second table storing AP ID/name (e.g., 10520). The system uses the AP model name table 10510 and the name table 10520 to identify the sites in which the AP43 model is installed as well as the sites which have an AP named "AP43" and from which the user has a privilege to get information.

The system then uses heuristics to infer that a) because the request is related to troubleshooting then the method should query the network analysis tool e.g., VNA tool. The system uses this information, along with the fact that the entity was determined to be either AP model AP43 or APs named AP43 and construct a queries to the VNA to obtain the status of all APs of model AP43 and all APs called AP43 which are exhibiting SLE degradation from the specific sites for which the user is privileged to get information. The information is then presented to the dialog engine and displayed to the user.

It should be noted that since the intent was determined to be a request to troubleshoot the system the heuristics determine that a query is constructed using the entities obtained using the fuzzy searches. The query returns a list of the APs with the lowest SLE including the root causes of the SLE degradation.

Another example command is "unhappy users on iOS in the last 7 days". The intent is identified as "unhappy users" and the entities are identified as "iOS" and "last seven days". In some embodiments, heuristics translate the "unhappy user" into an intent to troubleshoot. The last seven days are converted to a specific start and stop times based on the time associated with the browser of the user.

A fuzzy query is performed against the entity table 10590 for the "iOS" entity. Results of the query indicate "iOS" relates to a mobile device operating system name property value. The field 10594 identifies the client operating system table 10530 and specifically an address of the table which contains mobile device operating system property names values. The client operating system table 10530 and specifically fields 10534*a-n* identify the sites in which the iOS OS runs and from which the user has privilege to get information.

Heuristics infer that because the request is related to troubleshooting, a troubleshooting query application is to be invoked, then the request should query the VNA tool. Parameters to the query tool are then generated based on the reference to iOS devices, the specified time window. The generated parameter list requests status information. When the query is performed, results consistent with the user's privilege level are returned and identify which iOS devices are exhibiting SLE degradation. The information is then presented to the user, either visually or aurally. In accordance with another example implementation, the input to the troubleshooting tool, e.g., VNA, includes the sites for which the user is allowed to obtain information and as such nullifying the need to filter the information based on the user's privileges.

It should be noted that since the intent was determined to be a request to troubleshoot the system the heuristics determine that the query is performed using the entities obtained using the fuzzy searches. Thus, parameters to the query are generated accordingly, and the query returns a list of APs with the poorest SLE. The information also indicates root causes of the SLE.

FIG. 10C shows alternative example data structures implemented in one or more of the disclosed embodiments. As with the data structures of FIGS. 10A-B, the data structures of FIG. 10C are discussed as relational database tables. However, these are just examples, and some embodiments utilize other data structure architectures, such as unstructured data stores, linked lists, arrays, or other structures.

FIG. 10C shows a site table 10600, a device table 10610, a user table 10620, a property table 10630, a property name table 10640, a query tool table 10645, and a parameter spec table 10650. The site table 10600 includes a site identifier field 10602 a site name field 10604, and a site address field 10606. The site identifier field 10602 uniquely identifies a particular site. The site name field 10604 stores a friendly name of the site (e.g., "San Jose."). The site address field 10606 stores an address of the identified site.

The device table 10610 includes a device identifier field 10612, a device name field 10614, a site identifier field 10616, and a device type field 10618. The device identifier field 10612 uniquely identifies a device. The site identifier field 10616 identifies at which site the device is located. The site identifier field 10616 is cross referenceable with the site identifier field 10602. The device type field 10618 stores an indicator of a type of the device (e.g. AP, station, router, switch).

The user table 10620 includes a user identifier field 10622, a user name field 10624, a site identifier field 10626, a device identifier field 10628, and a permissions field 10629. The user identifier field uniquely identifies a particular user that has established a session at a particular site (identified by the site identifier field 10626). The user name field 10624 stores a name of the user. The device identifier field 10628 identifies a device associated with the user, and is cross referenceable with the device identifier field 10612. The permissions field 10629 defines permissions of the user. For example, the permissions field 10629 defines what site information the identified user has access to. Some queries against the data store 106 provide only that data mapped to a site for which the user has permissions.

The document table 10660 includes a document identifier field 10662, document title field 10664, a site field 10666, and a document data field 10668. The document identifier field uniquely identifies a document. The document title field 10664 describes a title of the document. In some embodiments, the site field 10666 identifies the site at which the document resides. In some embodiments, the site field 10666 is not implemented or otherwise inoperative, in that documents are available from any site. The document data field 10668 defines data of the document itself. The version field 10669 defines the document version.

The property table 10630 stores property information for devices and users. The property table 10630 includes a property identifier field 10632, an identifier field 10634. In some embodiments, the identifier field 10634 identifies one of a device, user, or document. Some embodiments identify other types of query targets. The property table 10630 also includes a property type field 10636 and a property value field 10638.

The property identifier field 10632 uniquely identifies a particular property value for a particular user/device. The device identifier/user identifier field 10634 identifies which device or user has the property described by the row of the property table 10630. The property type field 10636 identifies a type of property described by the row of the property table 10630. For example, the property type field 10636 identifies whether the property is an operating system name property, a operating system version property, an IP address property, or other property type. The property value field 10638 stores a value of the property itself. Thus, for example, if the property type field 10636 indicates the property is an operating system name property, the property value field stores the name of the operating system, such as "Windows", "Mosaic", "Unix", "DEC Rainbow", or some other operating system name.

The property name table 10640 includes a property type field 10642 and a property friendly name field 10644. The property type field 10642 is cross referenceable with the property type field 10636. The property friendly name field 10644 provides a character based name of the property itself. Thus, for example, the property friendly name field 10644 stores "Operating System Name" for a property storing a value of a device's operating system name.

The query tool table 10645 includes an intent identifier field 10646 and a query tool field 10648. The intent identifier field 10646 identifies a particular intent provided in a query or command. For example, a first value in the intent identifier field 10646 identifies an intent of "list," while a second value in the intent identifier field 10646 identifies an intent of "troubleshoot." The query tool field 10648 identifies a particular query tool to use when querying the data store 106. For example, a first value in the query tool field 10648 identifies a virtual network assistant tool, while a second value in the query tool field 10648 identifies a second tool, such as a SQL query tool. The query tool table 10645 is used, by some embodiments, to identify an appropriate query tool to use for a particular intent included in a query/command.

The parameter spec table 10650 includes an intent identifier field 10652, a query target type field 10654, and a parameter spec field 10656. The intent identifier field 10652 operates in a similar manner to the intent identifier field 10646. The query target type field 10654 identifies a type of device being queried. Thus, for example, the query target type field 10654 identifies a user, a document, an AP, a switch, a mobile deice, or a laptop device depending on its value, at least in some embodiments. The parameter spec field 10656 defines parameters that are to be passed to a query tool based on the intent and the type of device being queried. As one simple example of a parameter spec field, an example parameter spec field is defined as, in some embodiments, "IP address=$IP addr: request=dropped connections." In this example, an IP address of the queried device is dynamically populated into the $IP addr variable, and the parameter set requests the query tool to obtain a number of dropped connections from the queried device.

Figure 11:
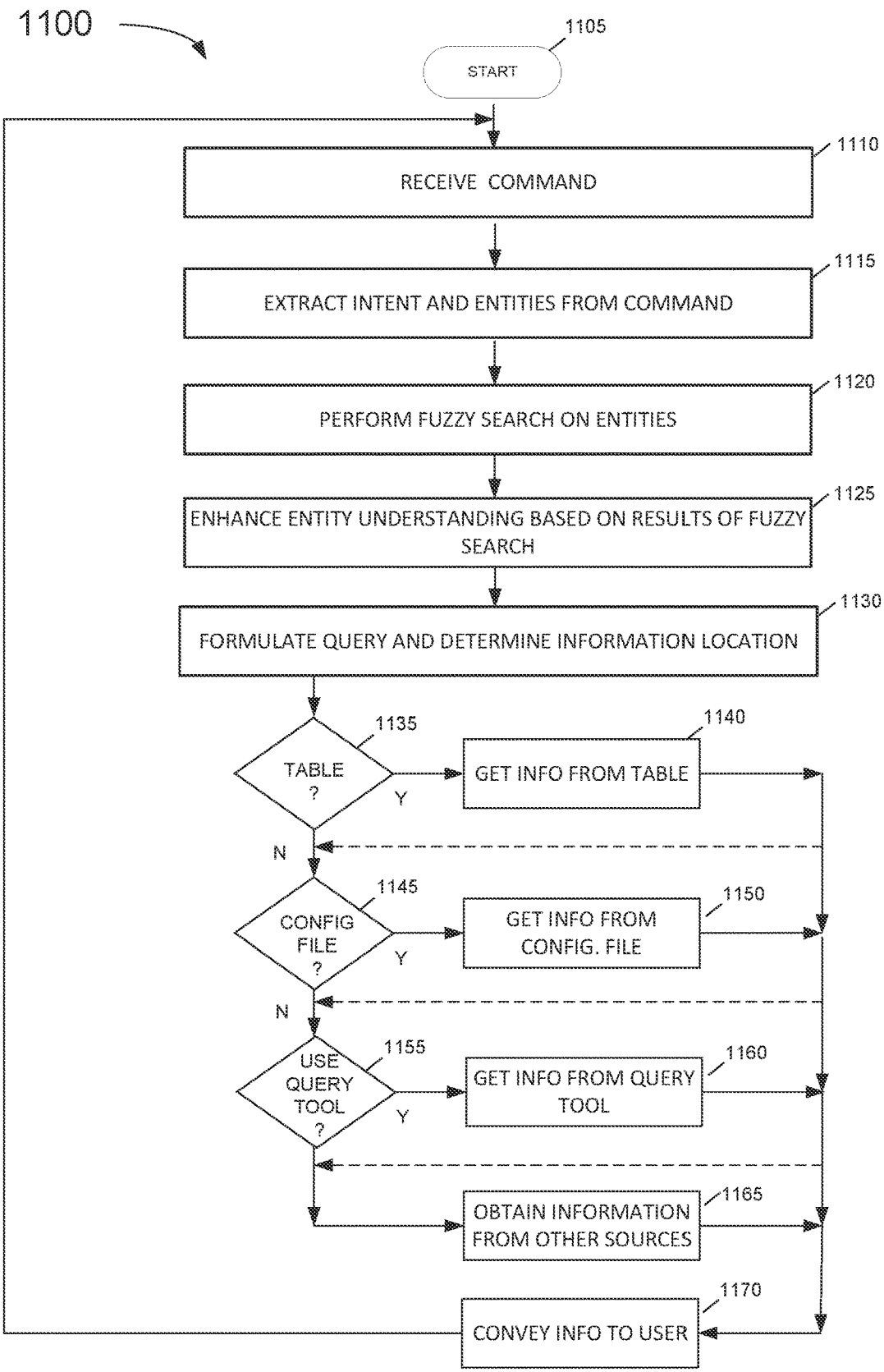
FIG. 11 is a flowchart of an example method for acting upon a command.

FIG. 11 is a flowchart of an example method for acting upon a command. In some embodiments, the method 1100 discussed below with respect to FIG. 11 is performed by the processor 906 of FIG. 9. Method 1100 begins at start operation 1105 and then moves to operation 1110, where a command is received.

In operation 1115, an intent and entity is extracted from the command. In some embodiments, operation 1115 is performed by a natural language processor.

In operation 1120, a fuzzy search is performed based on the entity. As discussed above, in some embodiments, a fuzzy search searches a data structure analogous to the table 10590 for a property value similar or equivalent to the specified entity. As discussed above, in some embodiments, if no exact matches are found, matches within an edit distance or within a threshold distance within a vector space are identified as matching.

Result of the fuzzy search is used in operation 1125 to enhance the understanding of the entity of the user and the related entities. For example, when the user enters "list Mojave devices", the fuzzy search indicates that Mohave match an operating system name property value and that the identified OS runs on mobile clients.

Operation 1130 generates a query based on the enhanced understanding provided by operation 1125. Generating the query includes generating a parameter set for a query tool. Operation 1130 also, in some cases, determines which tables in the data store 106 should be queried for the requested information. Some embodiments use the enhanced insight to obtain additional information and provide a response.

If decision operation 1135 determines that requested information resides in a table, method 1100 queries the appropriate table in operation 1140.

If decision operation 1145 determines that requested information resides in static configuration DB or files, method 1100 assesses the configuration DB or files in operation 1150 and obtains the requested information.

If decision operation 1155 determines that requested information is best obtained from a query tool, method 1100 invokes the query tool in operation 1160 and obtains the requested information. Otherwise, the method 1100 collects information from other resources such as web pages or simply redirects the user's device to the URL with the requested input.

The method 1100 then proceeds to operation 1170, where results of the method 1100 are presented. Presentation can occur via either an electronic display, such as a display on the mobile device 116 or the console terminal 118, or via an audio output, such as the speaker 112, discussed above with respect to FIG. 1A. Method 1100 then returns to operation 1110.

Though the explanation above mentions obtaining information from one of the data depositories, those skilled in the art would recognize that information is collected from multiple sources in some embodiments. The process of collecting information from multiple sources is highlighted in the figure by the dotted lines. For example, after collecting information from the table in operation 1140, the process continues to decision operation 1145 and assesses whether there is any additional information that may need to be collected from the configuration file, from the query tool, or from any other data depository.

Similarly, after collecting information from the configuration file in operation 1150, the process continues to decision operation 1155 and assesses whether there is any additional information that may need to be collected from the a query tool, e.g., VNA, or from any other data depository, and after collecting information from the VNA in operation 1160, the process continues to operation 1165 and assesses whether there is any additional information that may need to be collected from any other data depository.

FIG. 12 illustrates an example lookup table 1200 in accordance with one or more embodiments. Those skilled in the art should recognize that other implementations such as linked lists, rational DB, etc., are covered by our invention as well.

Column 1220 is an example of entities stored in the example lookup table 1200. Items 1221-1229 provide a list of OSs used by clients and or servers associated with the network. For example the OS in row 1221 is Mojave, the OS in row 1222 is iOS, etc.

Items 1231-1239 provide a list of AP IDs associated with the network. For example the ID of the AP in row 1231 is AP13, the ID of the AP in row 1232 is Mist, the ID of the AP in row 1233 is Mist182, etc.

Items 1242-1249 provide a list of IDs of users associated with the network. For example, an ID of the user indicated by item 1242 is John Smith, the ID of the user in row 1243 is Sally Brown, etc.

Column 1202 identifies whether the item is an OS (by inserting a specific character, e.g., an "x", in the corresponding entry). Column 1203 provides the vector value of the corresponding item. For example the OS name "Mojave" is translated by a program such as Word2Vec into a vector [13,4,67,90] and the OS name "iOS" is translated to [89, 34,55,2], etc.

Column 1204 identifies whether the item is an AP (by inserting a specific character, e.g., an "x", in the corresponding entry). Column 1205 provides the vector value of the corresponding item. For example an AP name "AP13" is translated by a program such as Word2Vec into a vector [34, 346, 3, 63], an AP name "Mist" is translated to [12, 3, 46, 7], and an AP names "Mist182" is translated to [76, 351, 2, 36], etc.

Similarly, column 1206 identifies whether the item is user ID (by inserting a specific character, e.g., an "x", in the corresponding entry). Column 1207 provides the vector value of the corresponding item. For example User ID "John Smith" is translated by a program such as Word2Vec into a vector [764, 45, 2, 19], and User ID "Sally Brown" is translated to [86, 91, 63, 4], etc.

Figure 13:
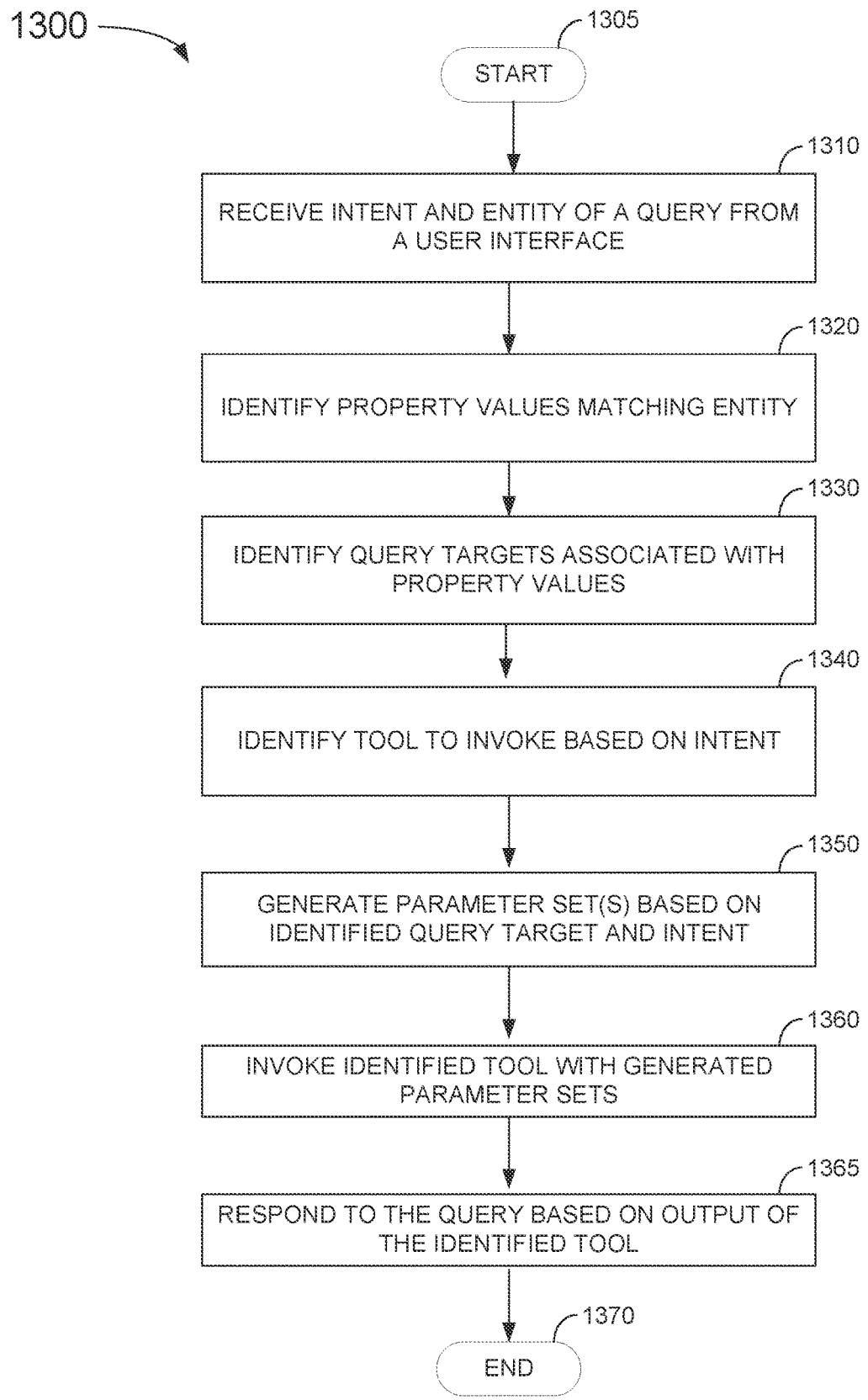
FIG. 13 is a flowchart of a method for providing a diagnostic interface to a managed multi-site network.

FIG. 13 is a flowchart of a method for providing a diagnostic interface to a managed multi-site network. In some embodiments, one or more of the functions discussed below with respect to FIG. 13 and method 1300 is performed by hardware processing circuitry. For example, in some embodiments, instructions (e.g., routines 914) stored in a memory (e.g. memory 912) configure a hardware processor (e.g. processor 906) to perform one or more of the functions discussed below with respect to method 1300.

After start operation 1305, method 1300 moves to operation 1310. In operation 1310, input including an intent and entity of a query is received. For example, as discussed above, some of the disclosed embodiments provide an interface to a user via either a traditional display/keyboard/mouse interface (or a touch screen interface for example on a smart phone), or provide a natural language interface for input from e.g., a microphone. From this interface, intent and entity components of a command or query are obtained.

In operation 1320, property values matching the entity are identified. In some embodiments, a data structure storing property values of devices attached to a multi-site network is searched to identify the property values matching the entity. For example, as discussed above, some embodiments maintain a data store (e.g. data store 106) which stores property values of devices attached to a multi-site network (e.g. sites 101A-D). An example of one organization of data structures storing property values is shown in FIG. 10C. In some embodiments, the identification is performed using a fuzzy search. The fuzzy search provides an ability to match the entity with property values that are not necessarily an exact match, but are instead within an "edit distance" of the entity or are within a predefined distance within a vector space of a property value. For example, some embodiments utilize a tool such as "Word2Vec" to convert entity values, e.g., device property values into vectors, which can then be mapped to a vector space. By mapping the entity to the same vector space, some embodiments identify entities that are within a predefined distance from a property value and determine that the entity "matches" such property values.

In some embodiments, the properties included in the data store indicate one or more of a model name of a device, an access point model number, an access point name, an operating system of a device, a name of an application executing on a device, or an account name associated with the device, device manufacturer, site name, user name, document title, document version number.

In operation 1330, query targets associated with the property values are identified. In some embodiments, one or more heuristics are invoked to identify query targets based on the identified property values. As one example, if an identified property value is a name of a mobile device operating system, a heuristic maps the identified property value to mobile devices that include the identified mobile device operating system. Thus, the query targets are the mobile devices including the identified mobile device operation system. As another example, if an identified property value is a model name of an AP, then the heuristics identify, in some embodiments, query targets that an AP's having the model name equivalent to the identified property value. As another example, if the identified property values are first names of a plurality of users, the heuristics identify query targets of user's having the first name. Thus, the heuristics, in some embodiments, fully specify the query targets by including account names linked to or associated with users having the identified first name, and or add last names as necessary to the query targets such that the query against the user will complete successfully. Thus, in various embodiments, the heuristics may employ a plurality of mappings, with each mapping mapping from one or more identified property values to one or more query targets. The heuristics also include, in some embodiments, rules that convert the identified property values to the query targets (e.g. a heuristic that maps from identified user first names to account names of users having the first name includes, in some embodiments, a database query to extract the account names from a data store based on the user's first name, and then to build query targets based on the extracted account names.

In operation 1340, a tool to invoke is identified based on the intent. For example, as discussed above with respect to FIG. 10C, some embodiments map an intent to a particular query tool. Thus, a "troubleshoot" intent invokes a first query tool while a "list" intent invokes a second query tool.

In operation 1350, a parameter set is generated based on the identified query target and the intent. For example, in some embodiments, parameters passed to a query tool vary based on a query target. For example, devices, users, or documents may require different parameters passed to a query tool to obtain relevant information. As discussed above in FIG. 10C, some embodiments map a query target type, such as a document, an access point, a user, or other device to a parameter specification (e.g. via field 10656) and/or a criterion (e.g. via field 10658).

In operation 1360, the identified query tool is invoked with the generated parameter set. Note that some embodiments of method 1300 identify multiple different query targets of different types and therefore invoke the query tool multiple times to collect information on the multiple query targets. An invoked query tool generates output based on a state of the data store and one or more parameters provided to the query tool. The output of the query tool is then parsed or decoded by the disclosed embodiments to generate a response to the original query or command that included the entity and intent of operation 1310.

The response to the original command/query is then provided based on results of the invocation of the query tool(s) in operation 1365. For example, in some embodiments, providing a response includes generating an audio signal indicating the response. An audio signal is generated, for example, in some embodiments that utilize a natural language processor to receive the command. In other embodiments, providing a response includes generating an output on an electronic display, such as to a chat bot or more traditional window oriented user interface.

In some embodiments, a response to the original command includes generating a signal to restart or reset a device, such as a switch or access point. For example, in some embodiments, the response indicates a switch or access point is unresponsive, has detected an internal fault, or has a performance or throughput problem that is likely to be corrected by a reset or restart action. Thus, some embodiments automatically, or without further human input, invoke a mitigating action on a network device based on the response to the query.

In some embodiments, the invocation of the query tools obtains performance metrics from one or more devices. For example, in some embodiments, which data is obtained from a query target is based on the intent. For example, a troubleshooting intent, in some embodiments, invokes a query tool so as to collect metrics that can be used to judge an SLE of one or more devices identified as query targets.

Some embodiments apply one or more criterion to results of the invocation to determine whether one or more query targets is operating in a nominal manner or is experiencing relatively poor SLE (e.g. the criterion test whether one or more operating parameters meet one or more criterion indicating poor performance or poor SLE). The criterion is obtained, in some embodiments, via a table that maps an intent and a query target type (e.g. document, AP, smart phone, or user) to a criterion (e.g., an AP criterion tests, in some embodiments, a number of connected devices and/or a latency of communications, while a user criterion tests, in some embodiments, a number of disconnects or failed login attempts by the user). In some embodiments, if one or more criterion are met, an indication that the device is experiencing good or poor SLE is provided.

Some of the disclosed embodiments then rank the query targets based on to what extent the query targets are experiencing poor SLE. Thus, some embodiments prioritize the display of information pertinent to query targets that are experiencing issues and deprioritize, or even, in some embodiments, suppress information relating to query targets that appear to be experiencing nominal performance.

Some embodiments periodically receive property information on devices attached to each site in a multi-site network. For example, as discussed above with respect to FIG. 1A, multiple sites, such as the sites 101A-D, provide device, user, and document property and state information to the data store 106. In some embodiments, this property and/or state information is stored in a property data structure, such as the property table 10630, discussed above with respect to FIG. 10C. Thus, when a new device, user, or document is added to a network, this periodic monitoring detects same and obtains property information to the data store. When a device, user, or document leaves the network, the periodic monitoring detects an absence of same and deletes said property information from the data store (e.g. data store 106).

In some embodiments, default property values for each site are also determined periodically. For example, a default property value is determined, in some embodiments, based on a property value of a majority of query targets located at a particular site. Thus, for example, if a majority of devices attached to a particular site are running a version 3.0 of a particular operating system, then, by use of heuristics, version 3.0 is determined to be the default property value for an operating system version property value for devices attached to that particular site. A different site is determined to have a different default operating system version property value, at least in some embodiments.

After operation 1365 completes, method 1300 moves to end operation 1370.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one example aspect.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks-Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.1 lad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology-Telecommunications and Information Exchange Between Systems Local and Metropolitan Area Networks-Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or, the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The example embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the example embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the example embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The example embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the embodiment(s). Additionally, the example techniques illustrated herein are not limited to the specifically illustrated embodiments but can also be utilized with the other example embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

In view of the disclosure above, various examples are set forth below. It should be noted that one or more features of an example, taken in isolation or combination, should be considered within the disclosure of this application.

Example 1 is a system to query a multi-site network, comprising: hardware processing circuitry; and one or more hardware memories storing instructions that when executed configure the hardware processing circuitry to perform operations comprising: periodically receiving, by a network management server, from a plurality of network agents installed at a corresponding plurality of network sites, information defining property values of devices communicating on a local network of the respective network site: storing, by the network management server, the received information in a data store; receiving, from a natural language processor (NLP), an intent and an entity of an NLP query; identifying a query application based on the intent, searching, based on the entity, the information stored in the data store; identifying, based on results of the search, a plurality of property values matching the entity, at least two of the plurality of property values associated with different properties; obtaining, from the data store and based on each of different properties, a corresponding list of query targets; querying, via the identified query application, each of the query targets; receiving responses to each of the queries; and responding to the NLP query based on the responses.

In Example 2, the subject matter of Example 1 optionally includes wherein obtaining the corresponding list of query targets comprises translating the plurality of property values to the query targets based on one or more heuristics.

In Example 3, the subject matter of any one or more of Examples 1-2 optionally include the operations further comprising: periodically determining, based on the defined property values of devices communicating on each of the local networks, default property values associated with the respective network site; and determining a parameter set based on the default property values, wherein the querying is based on the determined parameter set.

In Example 4, the subject matter of any one or more of Examples 1-3 optionally include the operations further comprising: in response to determining the intent is associated with a troubleshooting request: determining, for each list of query targets, a parameter set configured to obtain service level experience (SLE) information, wherein the querying of each query target is based on the respective parameter set, determining which of the service level experience information represents poor SLE, wherein the response to the NLP query indicates, based on the determining, which query targets are experiencing poor SLE; and responding to the NLP query based on the determining.

In Example 5, the subject matter of Example 4 optionally includes the operations further comprising: identifying, from the data store and based on each of the different properties, a respective criterion sets; determining, based on the responses to each of the queries, whether each of the criterion sets is met; and identifying, based on whether each criterion set has been met, which of the list of query targets represents at least one query target experiencing poor SLE, wherein the responding is based on the at least one query target.

In Example 6, the subject matter of any one or more of Examples 1-5 optionally include the operations further comprising: monitoring a network local to a networked site; detecting, based on the monitoring, a new device on the network; determine one or more property values associated with the new device; and adding, to the data store, an association between the one or more property values, the new device, and the network site.

In Example 7, the subject matter of Example 6 optionally includes the operations further comprising: detecting, based on the monitoring, a device has left the network: and deleting, from the data store, property values associated with the device in response to the detecting.

In Example 8, the subject matter of any one or more of Examples 1-7 optionally include wherein the properties of devices include one or more of a model name of a device, an access point model number, an access point name, an operating system of a device, a name of an application executing on a device, or an account name associated with the device, device manufacturer, site name, user name.

In Example 9, the subject matter of any one or more of Examples 1-8 optionally include wherein the intent indicates a troubleshooting request or the intent indicates a property list request, and wherein a first query application is identified when troubleshooting is requested and a second query application is identified when a property list is requested.

In Example 10, the subject matter of any one or more of Examples 1-9 optionally include wherein responding to the NLP query based on the responses includes generating an audio signal based on the responses and transmitting the audio signal.

In Example 11, the subject matter of any one or more of Examples 1-10 optionally include the operations further comprising determining privileges associated with an account performing the NLP query, wherein the obtaining of the query targets or the querying of each of the query targets is based on the privileges.

Example 12 is a method of querying a multi-site network, comprising: periodically receiving, by a network management server, from a plurality of network agents installed at a corresponding plurality of network sites, information defining property values of devices communicating on a local network of the respective network site; storing, by the network management server, the received information in a data store; receiving, from a natural language processor (NLP), an intent and an entity of an NLP query; identifying a query application based on the intent; searching, based on the entity, the information stored in the data store; identifying, based on results of the search, a plurality of property values matching the entity, at least two of the plurality of property values associated with different properties; obtaining, from the data store and based on each of different properties, a corresponding list of query targets; querying, via the identified query application, each of the query targets; receiving responses to each of the queries; and responding to the NLP query based on the responses.

In Example 13, the subject matter of Example 12 optionally includes wherein obtaining the corresponding list of query targets comprises translating the plurality of property values to the query targets based on one or more heuristics.

In Example 14, the subject matter of any one or more of Examples 12-13 optionally include periodically determining, based on the defined property values of devices communicating on each of the local networks, default property values associated with the respective network site; and determining a parameter set based on the default property values, wherein the querying is based on the determined parameter set.

In Example 15, the subject matter of any one or more of Examples 12-14 optionally include in response to determining the intent is associated with a troubleshooting request. determining, for each list of query targets, a parameter set configured to obtain service level experience (SLE) information, wherein the querying of each query target is based on the respective parameter set; determining which of the service level experience information represents poor SLE, wherein the response to the NLP query indicates, based on the determining, which query targets are experiencing poor SLE; and responding to the NLP query based on the determining.

In Example 16, the subject matter of Example 15 optionally includes identifying, from the data store and based on each of the different properties, a respective criterion sets; determining, based on the responses to each of the queries, whether each of the criterion sets is met; and identifying, based on whether each criterion set has been met, which of the list of query targets represents at least one query target experiencing poor SLE, wherein the responding is based on the at least one query target.

In Example 17, the subject matter of any one or more of Examples 12-16 optionally include monitoring a network local to a networked site; detecting, based on the monitoring, a new device on the network; determine one or more property values associated with the new device; and adding, to the data store, an association between the one or more property values, the new device, and the network site.

In Example 18, the subject matter of Example 17 optionally includes detecting, based on the monitoring, a device has left the network; and deleting, from the data store, property values associated with the device in response to the detecting.

In Example 19, the subject matter of any one or more of Examples 12-18 optionally include wherein the properties of devices include one or more of a model name of a device, an access point model number, an access point name, an operating system of a device, a name of an application executing on a device, or an account name associated with the device, device manufacturer, site name, user name.

In Example 20, the subject matter of any one or more of Examples 12-19 optionally include wherein the intent indicates a troubleshooting request or the intent indicates a property list request, and wherein a first query application is identified when troubleshooting is requested and a second query application is identified when a property list is requested.

In Example 21, the subject matter of any one or more of Examples 12-20 optionally include wherein responding to the NLP query based on the responses includes generating an audio signal based on the responses and transmitting the audio signal.

In Example 22, the subject matter of any one or more of Examples 12-21 optionally include determining privileges associated with an account performing the NLP query, wherein the obtaining of the query targets or the querying of each of the query targets is based on the privileges.

Example 23 is a non-transitory computer readable storage medium comprising instructions that when executed configure hardware processing circuitry to perform operations to query a multi-site network, comprising: periodically receiving, by a network management server, from a plurality of network agents installed at a corresponding plurality of network sites, information defining property values of devices communicating on a local network of the respective network site; storing, by the network management server, the received information in a data store; receiving, from a natural language processor (NLP), an intent and an entity of an NLP query; identifying a query application based on the intent; searching, based on the entity, the information stored in the data store; identifying, based on results of the search, a plurality of property values matching the entity, at least two of the plurality of property values associated with different properties; obtaining, from the data store and based on each of different properties, a corresponding list of query targets; querying, via the identified query application, each of the query targets; receiving responses to each of the queries; and responding to the NLP query based on the responses.

In Example 24, the subject matter of Example 23 optionally includes wherein obtaining the corresponding list of query targets comprises translating the plurality of property values to the query targets based on one or more heuristics.

In Example 25, the subject matter of any one or more of Examples 23-24 optionally include periodically determining, based on the defined property values of devices communicating on each of the local networks, default property values associated with the respective network site; and determining a parameter set based on the default property values, wherein the querying is based on the determined parameter set.

In Example 26, the subject matter of any one or more of Examples 23-25 optionally include in response to determining the intent is associated with a troubleshooting request: determining, for each list of query targets, a parameter set configured to obtain service level experience (SLE) information, wherein the querying of each query target is based on the respective parameter set; determining which of the service level experience information represents poor SLE, wherein the response to the NLP query indicates, based on the determining, which query targets are experiencing poor SLE; and responding to the NLP query based on the determining.

In Example 27, the subject matter of Example 26 optionally includes identifying, from the data store and based on each of the different properties, a respective criterion sets; determining, based on the responses to each of the queries, whether each of the criterion sets is met; and identifying, based on whether each criterion set has been met, which of the list of query targets represents at least one query target experiencing poor SLE, wherein the responding is based on the at least one query target.

In Example 28, the subject matter of any one or more of Examples 23-27 optionally include monitoring a network local to a networked site; detecting, based on the monitoring, a new device on the network; determine one or more property values associated with the new device; and adding, to the data store, an association between the one or more property values, the new device, and the network site.

In Example 29, the subject matter of Example 28 optionally includes detecting, based on the monitoring, a device has left the network; and deleting, from the data store, property values associated with the device in response to the detecting.

In Example 30, the subject matter of any one or more of Examples 23-29 optionally include wherein the properties of devices include one or more of a model name of a device, an access point model number, an access point name, an operating system of a device, a name of an application executing on a device, or an account name associated with the device, device manufacturer, site name, user name.

In Example 31, the subject matter of any one or more of Examples 23-30 optionally include wherein the intent indicates a troubleshooting request or the intent indicates a property list request, and wherein a first query application is identified when troubleshooting is requested and a second query application is identified when a property list is requested.

In Example 32, the subject matter of any one or more of Examples 23-31 optionally include wherein responding to the NLP query based on the responses includes generating an audio signal based on the responses and transmitting the audio signal.

In Example 33, the subject matter of any one or more of Examples 23-32 optionally include determining privileges associated with an account performing the NLP query, wherein the obtaining of the query targets or the querying of each of the query targets is based on the privileges.

The invention claimed is:

1. A system to query a multi-site network, comprising:
hardware processing circuitry; and
one or more hardware memories storing instructions that when executed configure the hardware processing circuitry to perform operations comprising:
storing, in a data store by a network management server configured to monitor a plurality of devices communicating on one or more local networks of the multi-site network, an entity table including, for each of a plurality of entities, a first field storing an entity name and a second field storing a number of meanings associated with the entity name;
receiving, from a natural language processor (NLP), an intent and an entity of an NLP query;
identifying a query application based on the intent of the NLP query;
identifying an entity name based on the entity of the NLP query;
obtaining, from the data store and based on the entity name, a plurality of query targets, wherein a first one of the query targets includes one of the plurality of devices corresponding to the first meaning of the entity name and a second one of the query targets includes a different one of the plurality of devices corresponding to the second meaning of the entity name;
querying, via the identified query application, each of the plurality of query targets to obtain service level experience (SLE) information indicative of performance of the local network corresponding to each of the plurality of query targets, wherein the first one of the query targets is queried based on a first criterion associated with the first meaning of the entity name and the second one of the query targets is queried based on a second criterion associated with the second meaning of the entity name;
determining, based on responses received to the queries of the plurality of query targets, that a first one of the plurality of query targets is associated with sub-nominal performance of the local network and a second one of the plurality of query targets is associated with nominal operation of the local network;
ranking the first one of the plurality of query targets associated with the sub-nominal performance more highly than the second one of the plurality of query targets associated with nominal operation; and
generating a response to the NLP query based on the ranking for display on a user computing device, wherein the response to the NLP query includes an indication that the first one of the plurality of query targets is associated with sub-nominal performance of the local network.

2. The system of claim 1, wherein obtaining the query targets comprises obtaining the query targets based on one or more heuristics.

3. The system of claim 1, the operations further comprising:
in response to determining the intent is associated with a troubleshooting request, determining, for each of the plurality of query targets, a parameter set configured to obtain the SLE information, wherein the querying of each query target is based on the respective parameter set.

4. The system of claim 3, the operations further comprising:
identifying a first criterion set based on the first meaning of the entity name;
identifying a second criterion set based on the second meaning of the entity name; and
identifying, based on whether each criterion set has been met, which of the first or second query targets is experiencing poor SLE.

5. The system of claim 1, the operations further comprising:
monitoring a network local to a networked site;
detecting, based on the monitoring, a new device on the network;
determine one or more property values associated with the new device; and adding, to the data store, an association between the one or more property values, the new device, and the network site.

6. The system of claim 5, the operations further comprising:
    detecting, based on the monitoring, a device has left the network; and
    deleting, from the data store, property values associated with the device in response to the detecting.

7. The system of claim 1, wherein the data store further includes one or more of a model name of a device, an access point model number, an access point name, an operating system of a device, a name of an application executing on a device, an account name associated with the device, a device manufacturer, a site name, or a user name.

8. The system of claim 1, wherein the intent indicates a troubleshooting request or the intent indicates a property list request, and wherein a first query application is identified when troubleshooting is requested and a second query application is identified when a property list is requested.

9. The system of claim 1, wherein responding to the NLP query based on the responses includes generating an audio signal based on the responses and transmitting the audio signal.

10. The system of claim 1, the operations further comprising determining privileges associated with an account performing the NLP query, wherein the obtaining of the query targets or the querying of each of the query targets is based on the privileges.

11. The system of claim 1, the operations further comprising:
    prioritizing the first one of the plurality of query targets associated with the sub-nominal performance and deprioritizing the second one of the plurality of query targets associated with nominal operation; and
    suppressing information relating to the second one of the plurality of query targets associated with nominal operation.

12. The system of claim 1, wherein the response to the NLP query further includes an indication that the second one of the plurality of query targets is associated with nominal operation.

13. The system of claim 1, wherein generating a response to the NLP query for display on a user computing device further includes:
    generating a first user selectable region including the indication that the first one of the plurality of query targets is associated with the sub-nominal performance; and
    generating a second user selectable region including the indication that the second one of the plurality of query targets is associated with nominal operation.

14. The system of claim 1, wherein querying, via the identified query application, each of the plurality of query targets further includes evaluating the first query target based on at least one first criterion and evaluating the second query target based on at least one second criterion, wherein the second criterion is different than the first criterion.

15. The system of claim 1, the operations further comprising automatically invoking at least one of a restart, a reset, or a change in transmission power of an access point corresponding to the first one of the plurality of query targets.

16. A method of querying a multi-site network, comprising:
    storing, in a data store by a network management server configured to monitor a plurality of devices communicating on one or more local networks of the multi-site network, an entity table including, for each of a plurality of entities, a first field storing an entity name and a second field storing a number of meanings associated with the entity name;
    receiving, from a natural language processor (NLP), an intent and an entity of an NLP query;
    identifying a query application based on the intent of the NLP query;
    identifying an entity name based on the entity of the NLP query;
    obtaining, from the data store and based on the entity name, a plurality of query targets, wherein a first one of the query targets includes one of the plurality of devices corresponding to the first meaning of the entity name and a second one of the query targets includes a different one of the plurality of devices corresponding to the second meaning of the entity name;
    querying, via the identified query application, each of the plurality of query targets to obtain service level experience (SLE) information indicative of performance of the local network corresponding to each of the plurality of query targets, wherein the first one of the query targets is queried based on a first criterion associated with the first meaning of the entity name and the second one of the query targets is queried based on a second criterion associated with the second meaning of the entity name;
    determining, based on responses received to the queries of the plurality of query targets, that a first one of the plurality of query targets is associated with sub-nominal performance of the local network and a second one of the plurality of query targets is associated with nominal operation of the local network;
    ranking the first one of the plurality of query targets associated with the sub-nominal performance more highly than the second one of the plurality of query targets associated with nominal operation; and
    generating a response to the NLP query based on the ranking for display on a user computing device, wherein the response to the NLP query includes an indication that the first one of the plurality of query targets is associated with sub-nominal performance of the local network.

17. The method of claim 16, wherein obtaining the query targets comprises obtaining the query targets based on one or more heuristics.

18. The method of claim 16, further comprising:
    in response to determining the intent is associated with a troubleshooting request, determining, for each of the plurality of query targets, a parameter set configured to obtain the SLE information, wherein the querying of each query target is based on the respective parameter set.

19. The method of claim 18, further comprising:
    identifying a first criterion set based on the first meaning of the entity name;
    identifying a second criterion set based on the second meaning of the entity name; and
    identifying, based on whether each criterion set has been met, which of the first or second query targets is experiencing poor SLE.

20. The method of claim 16, further comprising:
    monitoring a network local to a networked site;
    detecting, based on the monitoring, a new device on the network;

determine one or more property values associated with the new device; and adding, to the data store, an association between the one or more property values, the new device, and the network site.

21. The method of claim 16, wherein the data store further includes one or more of a model name of a device, an access point model number, an access point name, an operating system of a device, a name of an application executing on a device, an account name associated with the device, a device manufacturer, a site name, or a user name.

22. The method of claim 16, wherein the intent indicates a troubleshooting request or the intent indicates a property list request, and wherein a first query application is identified when troubleshooting is requested and a second query application is identified when a property list is requested.

23. A non-transitory computer readable storage medium comprising instructions that when executed configure hardware processing circuitry to perform operations to query a multi-site network, comprising:

storing, in a data store by a network management server configured to monitor a plurality of devices communicating on one or more local networks of the multi-site network, an entity table including, for each of a plurality of entities, a first field storing an entity name and a second field storing a number of meanings associated with the entity name;

receiving, from a natural language processor (NLP), an intent and an entity of an NLP query;

identifying a query application based on the intent of the NLP query;

identifying an entity name based on the entity of the NLP query;

obtaining, from the data store and based on the entity name, a plurality of query targets, wherein a first one of the query targets includes one of the plurality of devices corresponding to the first meaning of the entity name and a second one of the query targets includes a different one of the plurality of devices corresponding to the second meaning of the entity name;

querying, via the identified query application, each of the plurality of query targets to obtain service level experience (SLE) information indicative of performance of the local network corresponding to each of the plurality of query targets, wherein the first one of the query targets is queried based on a first criterion associated with the first meaning of the entity name and the second one of the query targets is queried based on a second criterion associated with the second meaning of the entity name;

determining, based on responses received to the queries of the plurality of query targets, that a first one of the plurality of query targets is associated with sub-nominal performance of the local network and a second one of the plurality of query targets is associated with nominal operation of the local network;

ranking the first one of the plurality of query targets associated with the sub-nominal performance more highly than the second one of the plurality of query targets associated with nominal operation; and generating a response to the NLP query based on the ranking for display on a user computing device, wherein the response to the NLP query includes an indication that the first one of the plurality of query targets is associated with sub-nominal performance of the local network.

* * * * *